(12) United States Patent
Hatae et al.

(10) Patent No.: US 6,678,769 B1
(45) Date of Patent: Jan. 13, 2004

(54) CONTROL APPARATUS AND METHOD FOR MANAGING A LOGICAL CONNECTION BETWEEN SOURCE AND DESTINATION NODES

(75) Inventors: Shinichi Hatae, Kawasaki (JP); Takashi Kobayashi, Yokohama (JP); Mitsuo Niida, Yokohama (JP); Shinji Ohnishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/252,922

(22) Filed: Feb. 19, 1999

(30) Foreign Application Priority Data

| Feb. 24, 1998 | (JP) | 10-042656 |
| Mar. 2, 1998 | (JP) | 10-049892 |
| Mar. 2, 1998 | (JP) | 10-049893 |
| Mar. 2, 1998 | (JP) | 10-066216 |

(51) Int. Cl.$^7$ .............................. G06F 13/00
(52) U.S. Cl. ............................................ 710/105
(58) Field of Search ...................... 710/105, 305, 710/104, 106

(56) References Cited

U.S. PATENT DOCUMENTS

| 5,740,373 A | * | 4/1998 | Isaka .......................... 710/105 |
| 5,794,005 A | * | 8/1998 | Steinman ..................... 703/17 |
| 5,963,448 A | * | 10/1999 | Flood et al. .................. 700/82 |
| 6,049,889 A | * | 4/2000 | Steely, Jr. et al. .......... 711/154 |
| 6,075,791 A | * | 6/2000 | Chiussi et al. ............... 370/468 |
| 6,081,833 A | * | 6/2000 | Okamoto et al. ............ 709/213 |
| 6,115,392 A | | 9/2000 | Nomura ....................... 370/466 |
| 6,298,405 B1 | * | 10/2001 | Ito et al. ...................... 710/305 |
| 6,456,631 B1 | | 9/2002 | Nomura ....................... 370/466 |

FOREIGN PATENT DOCUMENTS

WO    WO 97/38513    10/1997

* cited by examiner

*Primary Examiner*—Paul R. Myers

(57) ABSTRACT

Provided are a communication system and a communication protocol for logically connecting a source node and one or more destination nodes, and for controlling data communication between the individual nodes by employing a connection ID that is used to identify the logical connection relationship.

Further, provided are a communication system and a communication protocol for correlating a connection ID with an offset address that designates in common the memory spaces included in one or more destination nodes, and for simplifying the designation of the offset address and the identification of the connection ID for data that are received.

Furthermore, provided are a communication system and a communication protocol for inhibiting an increase in a delay time that occurs before data communication is initiated between a source node and a plurality of destination nodes.

8 Claims, 13 Drawing Sheets

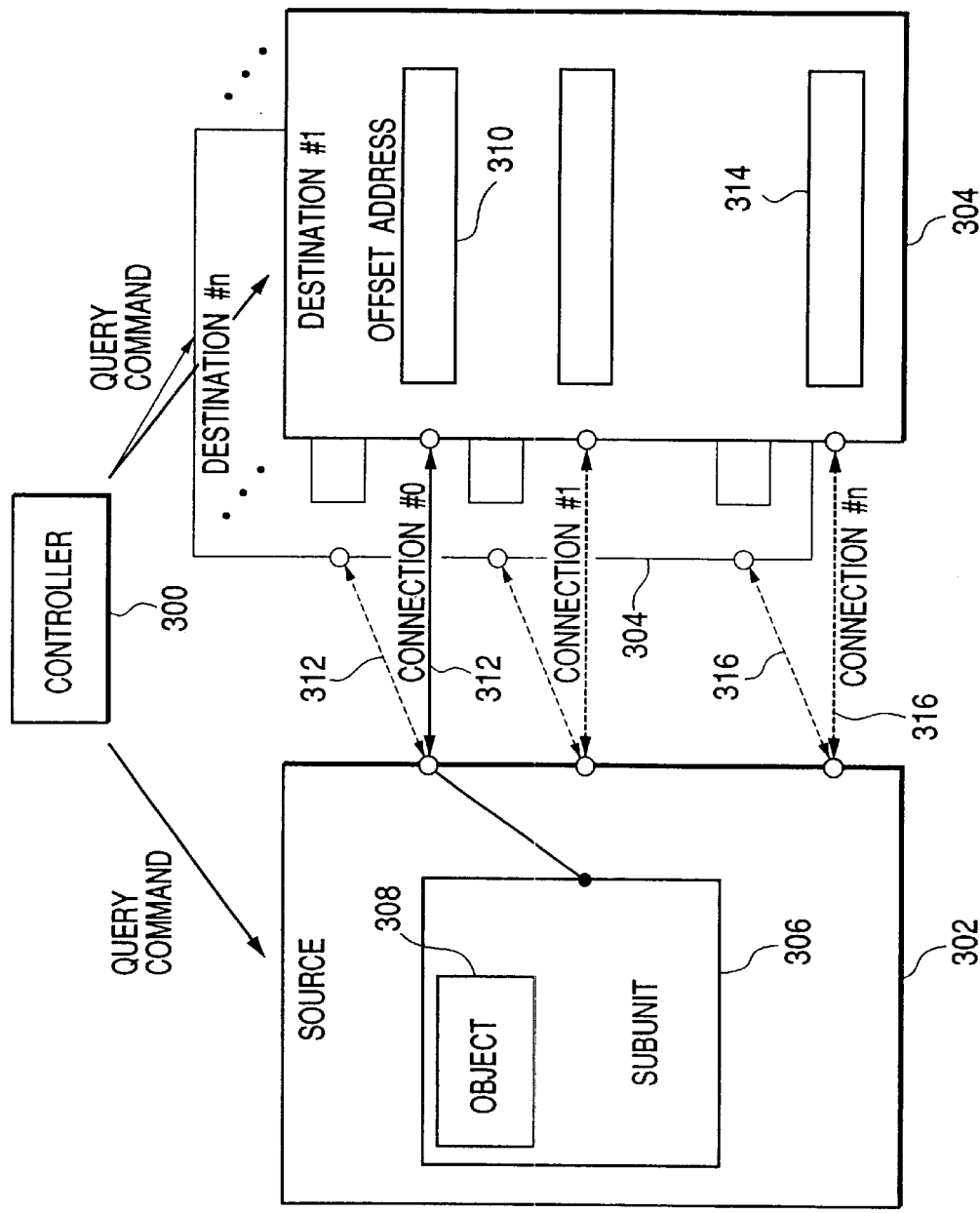

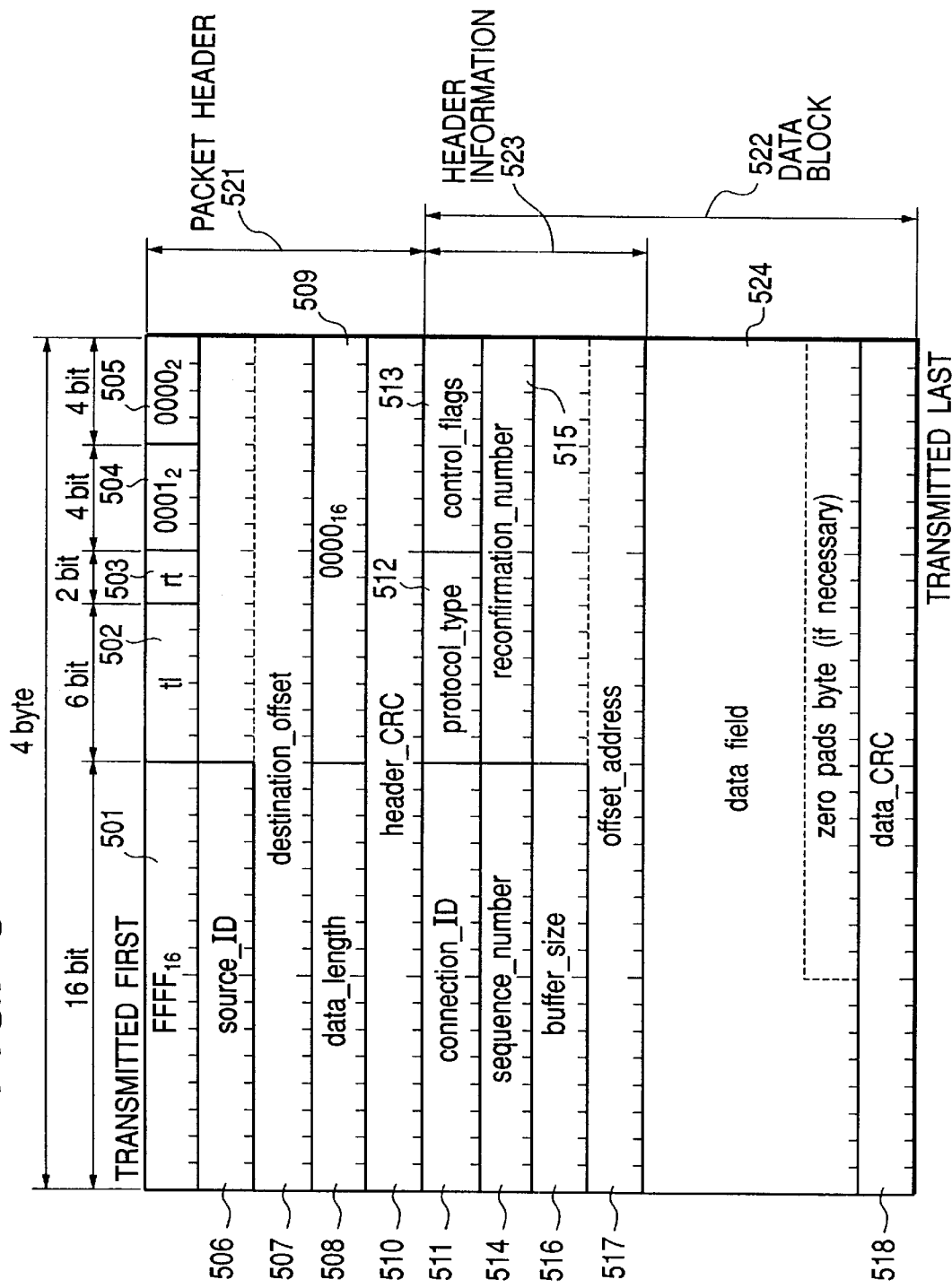

| Connection_ID | DESTINATION OFFSET | INNER BUFFER SIZE |
|---|---|---|
| 0 | ADDRESS 0 | SIZE 0 |
| 1 | ADDRESS 1 | SIZE 1 |
| 2 | ADDRESS 2 | SIZE 2 |

FIG. 15

| CONNECTION ID | OFFSET ADDRESS |
|---|---|
| 0 | ADDRESS 0 |
| 1 | ADDRESS 1 |
| 2 | ADDRESS 2 |
| ⋮ | ⋮ |

FIG. 16

| SPEED | BUFFER SIZE |
|---|---|
| S100 | SIZE 1 |
| S200 | SIZE 2 |
| S400 | SIZE 3 | even though there is an empty space

CONTROL APPARATUS AND METHOD FOR MANAGING A LOGICAL CONNECTION BETWEEN SOURCE AND DESTINATION NODES

BACKGROUND OF THE INVENTION

1. Field of the Invention

The present invention relates to a data communication system, a data communication method, a data communication apparatus, and a digital interface. In particular, the present invention pertains to a network for transmitting communication data (including image data) and command data together at a high speed, and a communication protocol that can be applied for the network.

2. Related Background Art

Conventionally, hard disks and printers are the peripheral devices that are most frequently employed with personal computers (PCs). One of these peripheral devices is connected to a PC via a special input/output interface or via a general-purpose digital interface, such as a SCSI (a small computer system interface).

Recently, however, AV (Audio/Visual) devices, such as digital cameras and digital video cameras, have become popular, and taken together they constitute another type of peripheral that can be used with a PC. Such an AV (Audio/Visual) device can be connected to a PC via an interface.

FIG. 1 is a diagram illustrating a conventional communication system that comprises a PC and an AV device.

In FIG. 1, 101 denotes an AV device (a digital camera, 102 denotes PC and 103 denotes a printer. The digital camera 1 comprises: a memory 104, in which image data is compressed and recorded; a decoder 105, for expanding the compressed image data stored in the memory 104 in order to decode them; an image processing unit 106; a D/A converter 107; a display unit 108 that includes an EVF; and a special digital I/O unit 109, for connecting the digital camera 101 and the PC 102.

The PC 102 comprises: a special digital I/O unit 110, for connecting the PC 102 to the digital camera 101; an operation unit 111, including a keyboard and a mouse; a decoder 112, for expanding the compressed image data in order to decode them; a display unit 113; a hard disk 114; a memory 115, such as a RAM; an MPU 116; a PCI bus 117; and a SCSI interface 118, for connecting the PC 102 to the printer 103.

The printer 103 comprises: a SCSI interface 119, for connecting the printer 103 to the PC 102; a memory 120; a printer head 121; a printer controller 122, for controlling the operation of the printer 103; and a driver 123.

In a conventional communication system the special digital interface (digital I/O unit) 109 of the digital camera 101 and the digital interface (SCSI interface) 119 of the printer 103 are not compatible, and one can not be directly connected to the other. Therefore, when, for example, the digital camera 101 is to transmit a still image to the printer 103, the PC must serve as a relay.

The conventional special digital interface 109 and the conventional SCSI interface 119 have many shortcomings: their data transfer rates are low, especially when, for a still image or a moving picture, there is a large amount of data to be transferred from an AV device; thick cables are employed for parallel communication; only a small number and a few types of peripheral devices can be connected; the connection system is limited; and data transfers can not be performed in real time.

A fast, high-performance, next generation digital interface that can resolve the above shortcomings is one that conforms to the well known IEEE (the Institute of Electrical and Electronics Engineers, Inc.) 1394-1995 interface standards.

A digital interface that conforms to the IEEE 1394-1995 interface standards (hereinafter referred to as a 1394 interface) has the following features.

(1) The data transfer speed is high.

(2) The real-time data transmission system, i.e., the isochronous transmission system, and the asynchronous transmission system are supported.

(3) A connection configuration (topology) having a high degree of freedom can be obtained.

(4) The Plug and Play function and the active line detachment function are supported.

However, while in the IEEE 1394-1995 standards the physical and electrical connections for a connector and the most fundamental data transmission systems are defined, a data type, a data format and a communication protocol to be employed for the exchange of data are not defined.

Since according to the IEEE 1394-1995 standards a response for the receipt of a packet is not defined for the isochronous transmission system, there is no way by which to ensure that an individual isochronous packet has been received. Therefore, the isochronous transmission system can not be employed when a plurality of sets of sequential data are to be transmitted, or when data in a file is to be transmitted by dividing the data into a plurality of data sets.

In the isochronous transmission system according to the IEEE 1394-1995 standards, the total number of communications is limited to 64, even though there is an empty space in a transmission band. Therefore, the isochronous transmission system is not adequate for multiple communications carried by a small transmission band.

According to the IEEE 1394-1995 standards, the transmission of data must be halted when a bus is reset because the power to a node is turned on or off, or when the connection or disconnection of the node is established. However, according to the IEEE 1394-1995 standards, when data transmission is halted (stopped) due to the resetting of a bus or to an error that occurs during transmission, the contents of the data that are lost can not be identified. Further, very complicated communication processing must be performed to resume the transmission.

The bus resetting function is a function for automatically identifying a new topology and for setting an address (node ID) that is allocated to the node. According to this function, the Plug and Play function and the active line detachment function can be provided by applying the IEEE 1394-1995 standards.

For a communication system that conforms to the IEEE 1394-1995 standards, real time processing is not required, and no specific communication protocol has been proposed that can be used for dividing a comparatively large amount of object data that must be reliable (e.g., still image data, graphics data, text data, file data or program data) into more than one data segment, and for sequentially transmitting the data segments.

In addition, for a communication system that conforms to the IEEE 1394-1995 standards, no specific communication protocol has been proposed that can be used to implement data communications among a plurality of devices by employing a communication method for the asynchronous broadcasting of data.

SUMMARY OF THE INVENTION

It is one object of the present invention to solve the above described problems.

It is another object of the present invention to provide a technique, for a data communication system, a data communication method, a data communication apparatus and a digital interface, whereby it is ensured that object data for which real time processing is not required can be sequentially transmitted.

It is an additional object of the present invention to provide a technique, for a data communication system, a data communication method, a data communication apparatus and a digital interface, whereby sequential transmission of data between a source node and one or more destination nodes can be satisfactorily halted through only simple processing, without complicated communication procedures being required.

As one preferred embodiment for such objects, according to the present invention, a data communication system comprises:

a source node for transmitting data composed of one or more segments by employing at least one asynchronous communication;

one or more destination nodes for receiving data from the source node; and a controller for setting a logical connection relationship between the source node and the one or more destination nodes, wherein one of the source node, the destination node and the controller halts transmission of the data.

As one more preferred embodiment of the present invention, a data communication system comprises:

a source node for transmitting data composed of one or more segments by employing at least one broadcast communication in accordance with a logical connection relationship; and one or more destination nodes for receiving data from the source node in accordance with the logical connection relationship;

wherein the transmission of the data is halted by either the source node or the one more destination nodes.

As another preferred embodiment of the present invention, a data communication method comprises the steps of:

establishing a logical connection relationship between a source node and one or more destination nodes;

transmitting data composed of one or more segments to the one or more destination nodes by employing at least one asynchronous communication; and receiving the data carried by the asynchronous communication in accordance with the logical connection relationship that has been established, wherein at least one of the source node, the destination node and a controller halts transmission of the data.

As an additional preferred embodiment of the present invention, a data communication method comprises the steps of:

transmitting data composed of one or more segments by employing at least one broadcast communication in accordance with a logical connection relationship; and receiving data from the source node in accordance with the logical connection relationship; and halting the transmission of the data using either the source node or the one more destination nodes.

As a further preferred embodiment of the present invention, a data communication method comprises the steps of:

assembling data composed of one or more segments to form as least one communication packet; and asynchronously transmitting the communication packet in accordance with a logical connection relationship that is established between a source node and one or more destination nodes; and halting asynchronous transmission of at least one communication packet.

As one further embodiment of the present invention, a data communication method comprises the steps of:

receiving at least one communication packet carried by an asynchronous communication in accordance with a logical connection relationship that is established between a source node and one or more destination nodes;

writing data included in the communication packet in a memory space used in common with another device; and halting asynchronous transmission of at least one communication packet.

As yet one more embodiment of the present invention, a data communication method comprises the steps of:

establishing a logical connection relationship between a source node and one or more destination nodes;

notifying the source node and the one or more destination nodes of a connection ID to be used to identify participants in the logical connection relationship; and halting asynchronous transmission of at least one communication packet.

As yet another embodiment of the present invention, a data communication apparatus comprises:

a unit for assembling data composed of one or more segments to form as least one communication packet; and a unit for asynchronously transmitting the communication packet in accordance with a logical connection relationship that is established between a source node and one or more destination nodes, wherein asynchronous transmission of at least one communication packet is capable of being halted.

As yet an additional embodiment of the present invention, a data communication apparatus comprises:

a unit for receiving at least one communication packet by an asynchronous communication in accordance with a logical connection relationship that is established between a source node and one or more destination nodes; and a unit for writing data included in the communication packet in a memory space used in common with another device, wherein asynchronous transmission of at least one communication packet is capable of being halted.

As yet a further embodiment of the present invention, a data communication apparatus comprises:

a unit for establishing a logical connection relationship between a source node and one or more destination nodes; and a unit for notifying the source node and the one or more destination nodes of a connection ID to be used to identify participants in the logical connection relationship, and for halting asynchronous transmission in accordance with the logical connection relationship.

As yet one further embodiment of the present invention, a digital interface comprises:

a unit for assembling data composed of one or more segments to form as least one communication packet; and a unit for asynchronously transmitting the communication packet in accordance with a logical connection relationship that is established between a source node and one or more destination nodes, wherein asynchronous transmission of at least one communication packet is capable of being halted.

As still one more embodiment of the present invention, a digital interface comprises:

a unit for receiving at least one communication packet by an asynchronous communication in accordance with a logical connection relationship that is established between a source node and one or more destination nodes; and a unit for writing data included in the communication packet in a memory space used in common with another device, wherein asynchronous transmission of at least one communication packet is capable of being halted.

As still another embodiment of the present invention, a digital interface comprises:

a unit for establishing a logical connection relationship between a source node and one or more destination nodes; and a unit for notifying the source node and the one or more destination nodes of a connection ID to be used to identify participants in the logical connection relationship, and for halting asynchronous transmission in accordance with the logical connection relationship.

Still other objects of the present invention and the advantages thereof will become fully apparent during the course of the following detailed description given for the embodiments.

BRIEF DESCRIPTION OF THE DRAWINGS

FIG. 3 is a conceptual diagram for explaining the basic structure of a communication protocol according to the first embodiment of the present invention;

FIG. 5 is a diagram showing the structure of an asynchronous broadcast packet according to the first embodiment;

FIG. 15 is a diagram for explaining correspondence relationship between connection ID and offset address; and FIG. 16 is a diagram for explaining correspondence relationship between data transferring speed and buffer size.

DETAILED DESCRIPTION OF THE PREFERRED EMBODIMENTS

The preferred embodiments of the present invention will hereinafter be described in detail while referring to the accompanying drawings.

Figure 1:
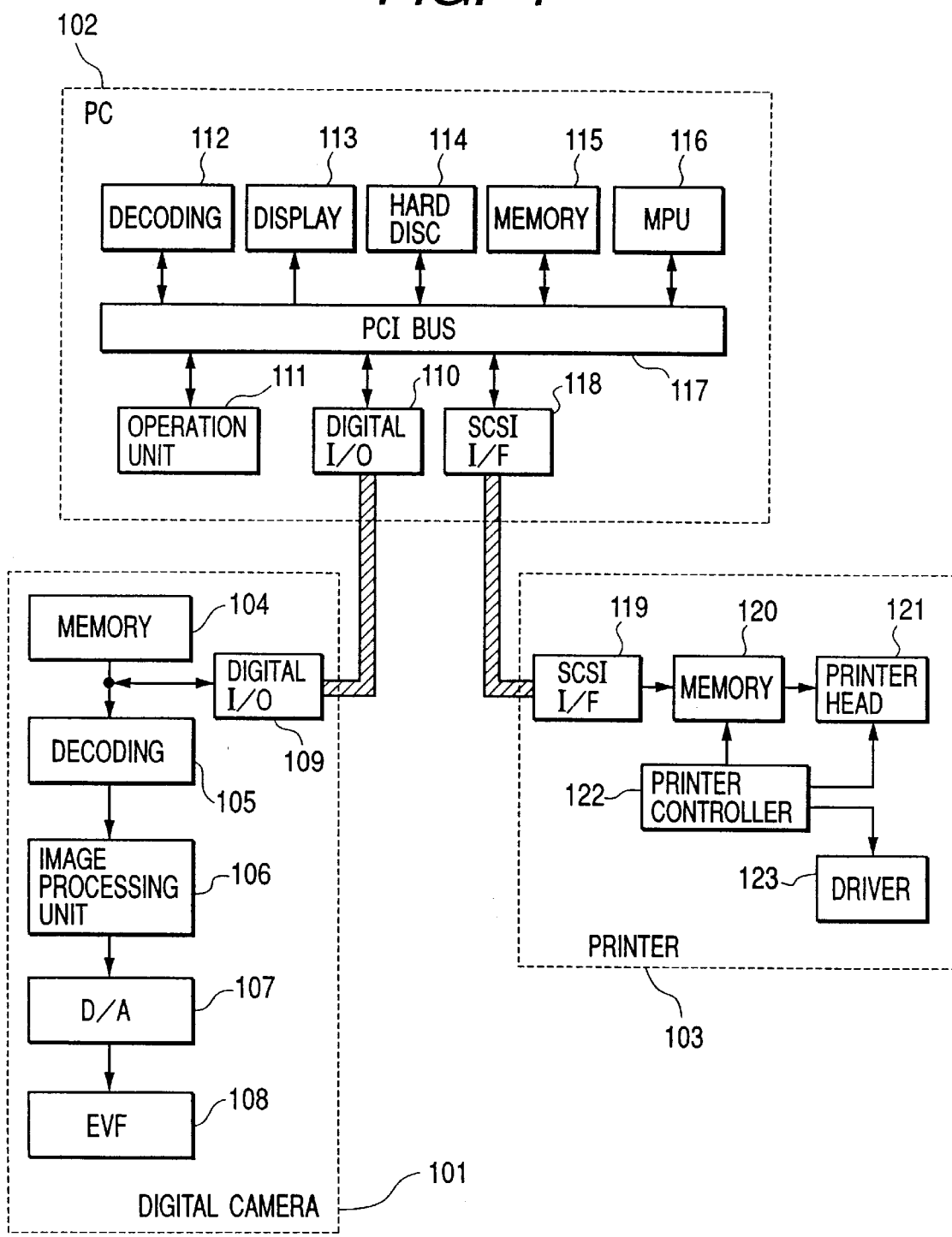
FIG. 1 is a diagram illustrating a conventional system.
Figure 2:
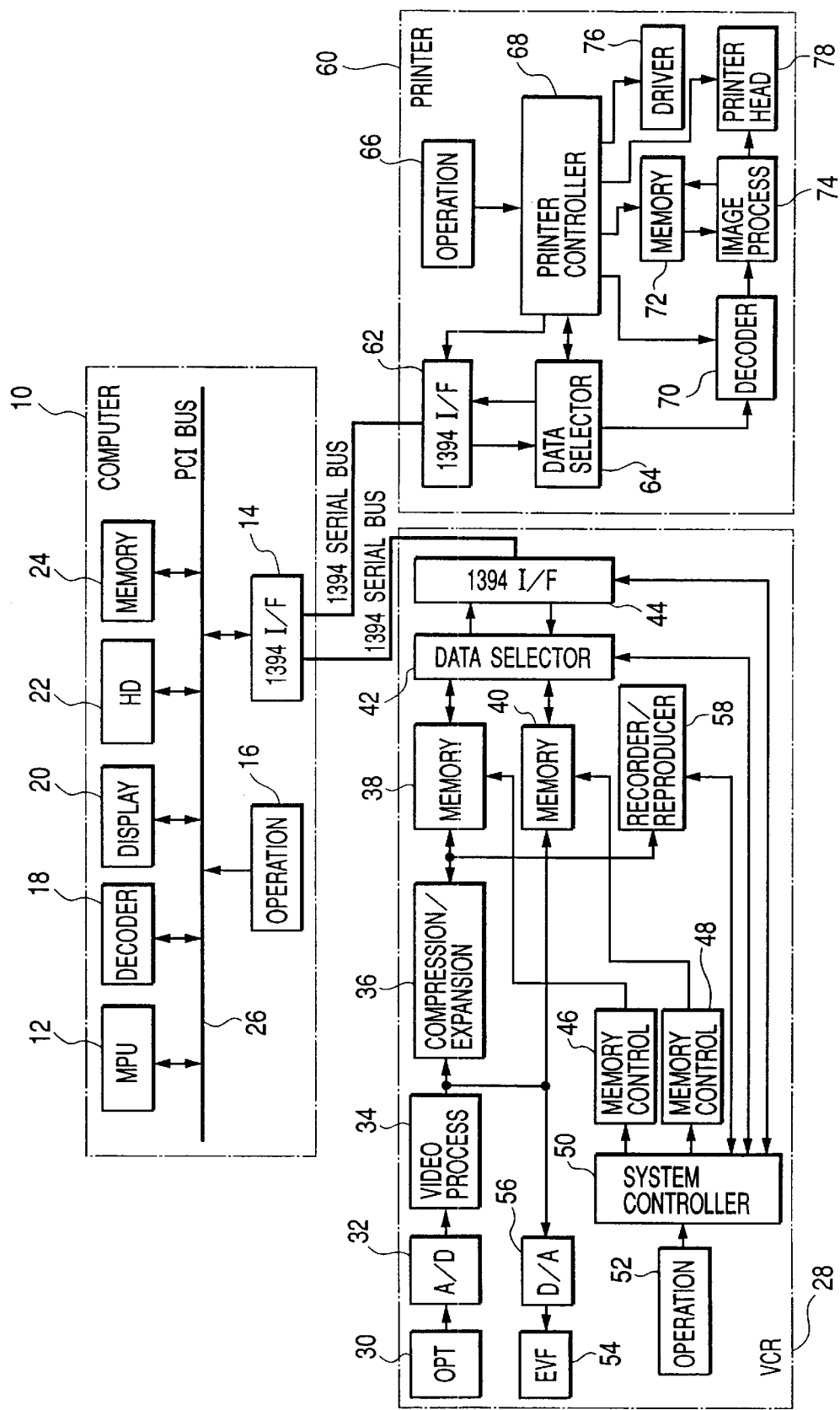
FIG. 2 is a block diagram showing an example arrangement for a communication system according to a first embodiment of the present invention.

FIG. 2 is a diagram illustrating an example arrangement of a data communication system according to a first embodiment of the present invention. As is shown in FIG. 2, the data communication system comprises a computer 10, a digital video recorder with built-in camera 28, and a printer 60.

The arrangement of the computer 10 will be described first. An MPU 12 controls the operation of the computer 10. A 1394 interface 14 includes a function that conforms to the IEEE 1394-1995 standards and a function that is associated with a communication protocol that is specified in this embodiment. An operating unit 16 includes a keyboard and a mouse. A decoder 18 decodes compressed and encoded digital data (moving image data, still image data, audio data, etc.). A display unit 20 includes a display device, such as a CRT display or a liquid crystal panel. A hard disk (HD) 22 is used to store various types of digital data (moving image data, still image data, audio data, graphics data, text data, program data, etc.), and an internal memory 24 is also provided as a storage medium. An internal bus 26 is, for example, a PCI bus that interconnects the individual sections of the computer 10.

The arrangement of the digital video recorder with built-in camera (hereinafter referred to as a DVCR) 28 will now be described. An image pickup unit (opt) 30 converts an optical image of an object into an electrical signal and converts the signal into an analog signal, and an analog/digital (A/D) converter 32 converts the analog signal into a digital signal. An image processing unit 34 changes digital moving image or still image data into digital image data having a predetermined format. A compression/expansion unit 36 includes a function for decoding compressed and encoded digital code (moving image data, still image data, audio data, etc.) and a function for performing the high-efficiency encoding of digital image data (e.g., like the MPEG or DV method, the digital image is vertical converted to provide a variable length predetermined unit image that is then quantized and encoded). A memory 38 is used to temporarily store digital image data for which high-efficiency encoding has been performed, and a memory 40 is used to temporarily store digital image data for which high-efficiency encoding has not been performed. A data selector 42 selects either the memory 38 or the memory 40. A 1394 interface 44 includes a function that conforms to the IEEE 1394-1995 standards and a function that is associated with the communication protocol that is specified in this embodiment. Memory controllers 46 and 48 control the writing and the reading processes for the memories 38 and 40. A system controller 50, which includes a microcomputer, controls the operation of the DVCR 28. An operating unit 52 includes a remote controller and an operation panel. A electronic viewfinder (EVF) 54 is used to display an analog image signal. A D/A converter 56 converts a digital signal into an analog signal. A recorder/reproducer 58 is a recording medium, such as a magnetic tape, a magnetic disk, or a magneto-optic disk, and is used to record or reproduce various types of digital data (moving image data, still image data or audio data and so on).

The arrangement of the printer 60 will now be described. A 1394 interface 62 includes a function for conforming to the IEEE 1394-1995 standards and a function that is associated with a communication protocol that is specified in this embodiment. 64 denotes a data selector. An operating unit 66 includes an operation button and a touch panel and so on. A printer controller 68 controls the operation of the printer 60. 70 denotes a decoder and 72 denotes an internal memory. An image processing unit 74 processes still image data, text data or graphics data it receives through a 1394 interface. 76 denotes a driver, and a printer head 78 performs printing.

As is shown in FIG. 2, the individual communication devices (hereinafter referred to nodes) of the computer 10, the DVCR 28 and the printer 60 are interconnected via 1394 interfaces 14, 44 and 62. Hereinafter a network constituted by the 1394 interfaces is referred to as a 1394 serial bus. Since a predetermined communication protocol is defined, the nodes can exchange various object data (e.g., moving image data, still image data, audio data, graphics data, text data, program data, etc.), and command data can be used to remotely control the nodes. In this embodiment, the communication protocol for the employment of the asynchronous transmission system is defined.

An explanation will now be given, while referring to FIG. 2, of the operations performed by the individual nodes constituting the communication system in this embodiment.

First, the functions of and the operations performed by the individual units of the computer 10 will be described.

In this embodiment, the computer 10 is operated, for example, as a controller for controlling the exchange of image data between the DVCR 28 and the printer 60, or as a controller for remotely controlling the DVCR 28 and the printer 60.

The MPU 12 executes software recorded on the hard disk 22, and moves various data to the internal memory 24. The MPU 12 also provides an arbitration function for the individual units that are connected by the internal bus 26.

The 1394 interface 14 can receive image data from the 1394 serial bus, and can transfer to the 1394 serial bus image data received from the hard disk 22 or from the internal memory 24. The 1394 interface 14 can also relay command data for exercising remote control of the other nodes along the 1394 serial bus. Further, the 1394 interface 14 has a function for transmitting to a different node a signal received via the 1394 serial bus.

A user selects desired software by using the operating unit 16 to instruct the MPU 12 to execute software recorded on the hard disk 22. Information concerning the software is provided the user by the display unit 20. In accordance with the software, the decoder 18 decodes image data received via the 1394 serial bus. The decoded image data are provided the user by the display unit 20.

The functions and operations of the individual units of the DVCR 28 will now be described.

In this embodiment, DVCR 28 is operated, for example, as an image transmitter (source node) for asynchronously transmitting image data based on the communication protocol for this embodiment.

The image pickup unit 30 converts the optical image of an object into an electrical signal consisting of a luminance signal (Y) and a color signal (C), and supplies the electrical signal to the A/D converter 32. The A/D converter 32 then converts the electrical signal into a digital signal.

The image processing unit 34 performs predetermined image processing for the digital luminance signal and the digital color signal, and mulitplexes the resultant digital signals. And thereafter the compression/expansion unit 36 compresses the digital luminance signal and the digital color signal. The compression/expansion unit 36 may employ a separate compression circuit and process the luminance signal and the color signal in parallel, or it may employ time sharing and process the two signals by using a compression circuit that is employed in common.

The compression/expansion unit 36 shuffles the compressed image data in order to provide a means for countering transmission path errors. Therefore, sequential code errors, i.e., consecutive errors, can be changed to dispersed errors, i.e., random errors, that can be easily corrected or interpolated. When a data volume that varies due to the density of the images projected onto a screen is to be made uniform, this process should be performed before compression, so that it will be convenient to employ variable length encoding, such as run length.

The compression/expansion unit 36 adds, to the compressed image data, data identification information (ID) for recovering from the shuffling. In addition, the compression/expansion unit 36 adds an error correction code (ECC) to the compressed image data in order to reduce the number of errors that occur during recording and reproduction.

The image data that are compressed by the compression/expansion unit 36 are transmitted to the memory 38 and the recorder/reproducer 58. The recorder/reproducer 58 adds the ID and the ECC to the compressed image data and records it on a recording medium, such as a magnetic tape. The compressed image data are stored in a different recording area from that used for audio data.

The D/A converter 56 converts the image data received from the image processing unit 34 into an analog image signal, and the EVF 54 displays the analog image signal it receives from the D/A converter 56. The image data processed by the image processing unit 34 are also transmitted to the memory 40. In this case, uncompressed image data are transmitted to the memory 40.

The data selector 42 selects the memory 38 or the memory 40 in accordance with an instruction issued by a user, and transmits either the compressed image data or the uncompressed image data to the 1394 interface 44. The data selector 42 transmits, to either the memory 38 or the memory 40, the image data received from the 1394 interface 44.

Based on the communication protocol that will be described later, the 1394 interface 44 asynchronously transmits the compressed image data or the uncompressed image data. Further, the 1394 interface 44 receives, via the 1394 serial bus, a control command for exercising control of the DVCR 28. The received control command is transmitted via the data selector 42 to the controller 50. The 1394 interface 44 issues a response acknowledging receipt of the control command.

The functions and operations of the individual units of the printer 60 will now be described.

The printer 60 in this embodiment is operated, for example, as an image receiver (destination node) for receiving image data that is asynchronously transmitted, based on the communication protocol for this embodiment, and for printing the received image data.

The 1394 interface 62 receives image data and a control command that are asynchronously transmitted via the 1394 serial bus. Thereafter, the 1394 interface 62 issues a response acknowledging receipt of the control command.

The received image data are transmitted via the data selector 64 to the decoder 70. The decoder 70 decodes the image data, and outputs the results to the image processing unit 74. The image processing unit 74 temporarily stores the decoded image data in the memory 72.

The image processing unit 74 converts the image data temporarily stored in the memory 72 into print data, and transmits the print data to the printer head 78. The printer head 78 executes a printing process under the control of the printer controller 68.

The received control command is transmitted via the data selector 64 to the printer controller 68. The printer controller 68 employs the control data to control various printing related procedures. For example, the printer controller 68 controls the driver 76 that feeds paper, and adjusts the position of the printer head 78.

The structures of the 1394 interfaces 14, 44 and 62 in this embodiment will now be described, while referring to FIG. 8.

The 1394 interface is functionally constituted by a plurality of layers. In FIG. 8, the 1394 interface is connected to the 1394 interface of another node via a communication cable 801 that conforms to the IEEE 1394-1995 standards. The 1394 interface has one or more communication ports 802, each of which is connected to a physical layer 803 that is included in the hardware portion.

Figure 8:
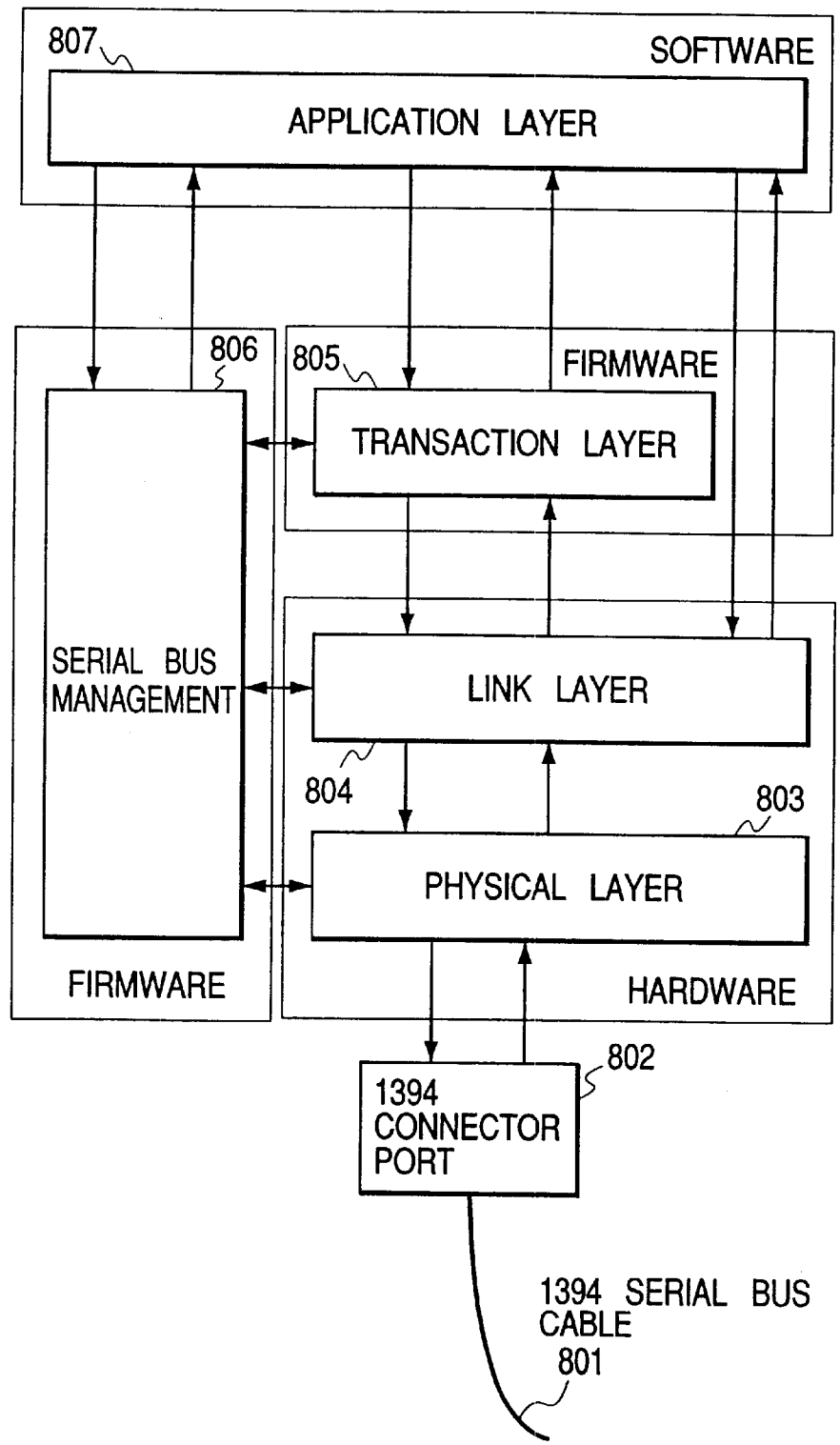
FIG. 8 is a diagram for explaining the structure of a 1394 interface according to the first embodiment.

In FIG. 8, the hardware portion includes the physical layer 803 and a link layer 804. The physical layer 803 serves as a physical and electrical interface with another node, detects the resetting of a bus and preforms associated processes, encodes/decodes an input/output signal, and provides an arbitration function to settle conflicts concerning the right of use of a bus. The link layer 804 generates a communication packet, exchanges various types of communication packets, and controls a cycle timer. In addition, the link layer 804 has a function for generating asynchronous broadcast packets and a function for exchanging such packets, which will be described later.

In FIG. 8, the firmware portion includes a transaction layer 805, and a serial bus management portion 806. The transaction layer 805 manages the asynchronous transmission system and provides various types of transactions (reading, writing and locking). The transaction layer 805 also provides an asynchronous broadcast transaction function, which will be described later. The serial bus management portion 806 provides a function for, based on the IEEE1212 CSR standards that will be described later, controlling the node that it belongs to, managing the connection state of the node, managing the ID information of the node, and managing the resources of the serial bus network.

The hardware portion and the firmware portion in FIG. 8 substantially constitute the 1394 interface, and its basic structure is as specified in the IEEE 1394-1995 standards.

The functioning of an application layer 807, which is included in a software portion and which designates object data and the method to be used for its transmission, varies in accordance with the application software that is to be used.

The communication protocol in this embodiment expands the functions of the hardware portion and the firmware portion of the 1394 interface and provides innovative transmission processing for the software portion.

The basic structure of the communication protocol defined in this embodiment will now be explained while referring to FIG. 3.

In FIG. 3, the basic structure comprises: a controller 300; a source node 302; n (n≧1) destination nodes 304; a sub-unit 306 included in the source node 302; and object data 308, such as still image data, graphics data, text data, file data or program data.

A first memory space 310 is defined in the destination node 304 by employing a predetermined destination offset (destination_offset #0). A first connection 312 represents a logical connection relationship established between the source node 302 and the destination node 304. It should be noted that the destination offset is an address by which to designate in common memory spaces in n destination nodes 304.

An n-th memory space 314 is defined in the destination node 304 by a predetermined destination offset (destination_offset #n). An n-th connection 316 represents the logical connection relationship established between the source node 302 and the destination node 304.

In this embodiment, the individual nodes manage the first to the n-th memory spaces 310 to 314 by using 64-bit address spaces that conform to the IEEE1212 CSR (Control and Status Register Architecture) standards (or the ISO/IEC 13213: 1994 standards). The IEEE 1212 CSR standards are those for specifying the control, the management and the address allocation for the serial bus.

Figure 6A:
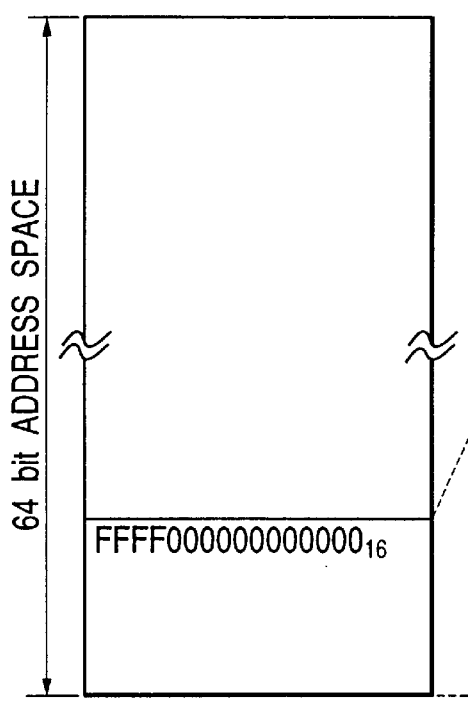
FIGS. 6A and 6B are diagrams for explaining an address space included in each node.
Figure 6B:
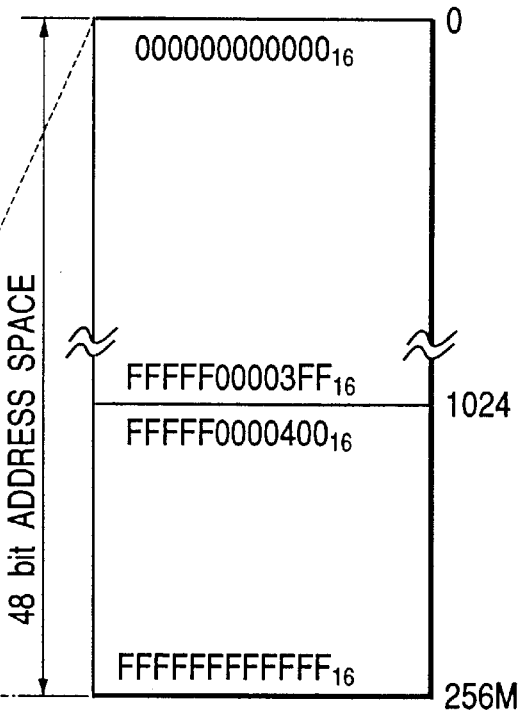

FIGS. 6A and 6B are diagrams for explaining the address space included in each node. In FIG. 6A is shown a logical memory space that is represented by a 64 bit address. In FIG. 6B is shown one part of the address space shown in FIG. 6A, where the upper 16 bits represent $FFFF_{16}$. The first memory space 310 to the nth memory space 314 in FIG. 3 employ a part of the memory space in FIG. 6B, and a destination offset address for each of them is included in the lower 48 bits of an address.

In FIG. 6B, for example, $000000000000_{16}$ to $0000000003FF_{16}$ define a reserved area, while actually the object data 308 are written in an area for which the starting address in the lower 48 bits is $FFFFF0000400_{16}$.

In FIG. 3, the source node 302 is a node that includes a function for transmitting the object data 308 in accordance with the communication protocol that will be described later. The destination node 304 is a node that includes a function for receiving the object data 308 from the source node 302. The controller 300 is a node for establishing a logical connection relationship between the source node 302 and one or more destination nodes 304 in accordance with the communication protocol that will be described later, and for managing the logical connection relationship.

Separate nodes may be provided as the controller 300, the source node 302 and the destination node 304. A single node may be provided as the controller 300 and the source node 302, and a single node may be provided as the controller 300 and the destination node 304. In this case, no transaction is required to be effected between the controller 300 and the source node 302, or the destination node 304, and the processing is simplified.

In this embodiment, the separate nodes are provided as the controller 300, the source node 302 and the destination node 304. The computer 10, including the 1394 interface 14, serves as the controller 300, the DVCR 28, including the 1394 interface 44, serves as the source node 302, and the printer 60, including the 1394 interface 62, serves as the destination node 304.

As is shown in FIG. 3, one or more connections can be established between the source node 302 and one or more destination nodes 304. When a request for the transmission of specific object data is issued, one or more controllers 300 establish these connections in accordance with the communication protocol that will be described later.

In this embodiment, one or more destination offsets can be set that can be used for one connection. The value of the destination offset may be either a value that is set in advance, or a variable value that the controller 300 or the source node 302 sets. It should be noted that the relationship between the connection and the destination offset is set in accordance with the communication protocol that will be described later.

When a plurality of destination offsets are to be set for one connection, data communication having a plurality of forms can be provided with a single connection. For example, when different offset addresses are allocated to different forms of data communication, one-to-one communication, one-to-N communication, and N-to-N communication can be implemented at the same time by a single connection.

In this embodiment, the computer 10 that serves as the controller 300 may act as the destination node 304. In this case, a connection is established between the source node 302 and two destination nodes 304, and the object data 308 are transmitted.

In this embodiment, the computer 10 serves as the controller 300, but it may not necessarily be designated the controller 300. The DVCR 28 or the printer 60 may also act as the controller 300.

An explanation will now be given for the basic transmission processing according to the communication protocol defined in this embodiment.

Figure 4A:
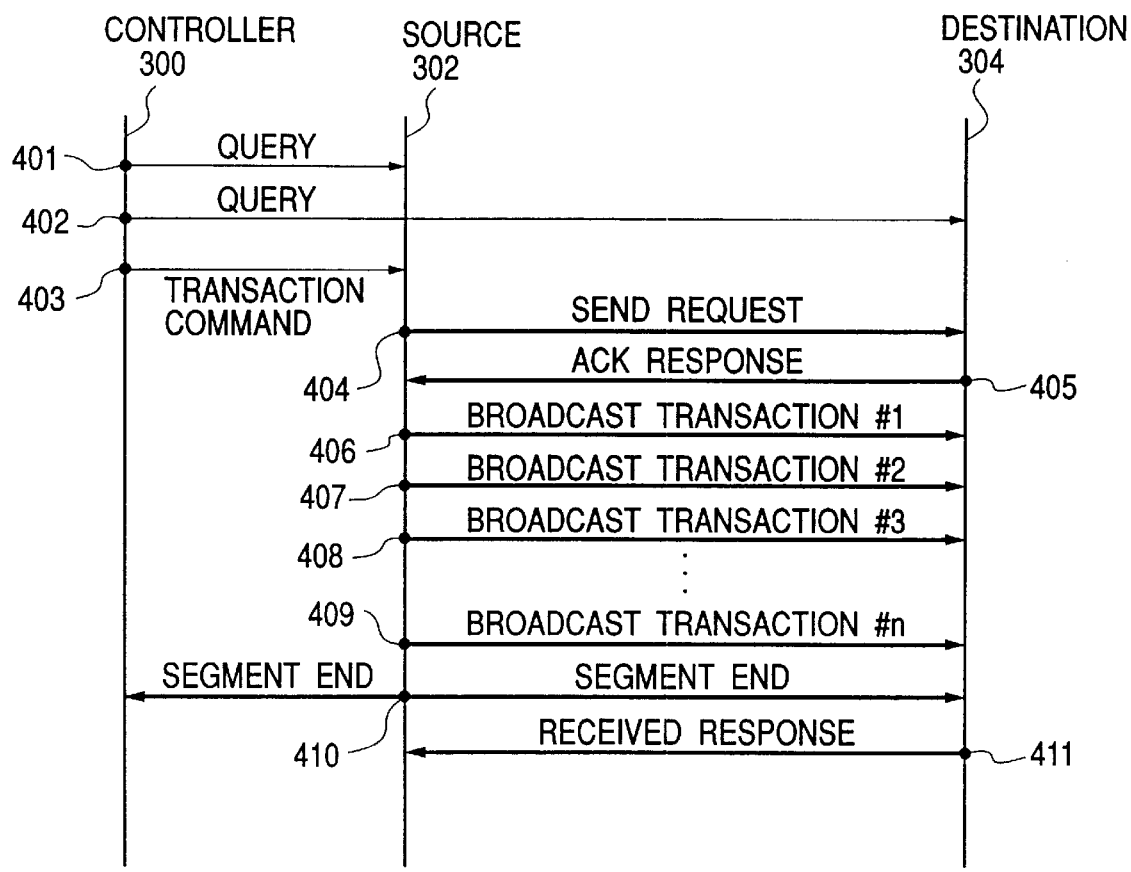
FIGS. 4A, 4B and 4C are sequence charts for explaining the basic communication procedure covered by the communication protocol according to the first embodiment of the present invention.
Figure 4B:
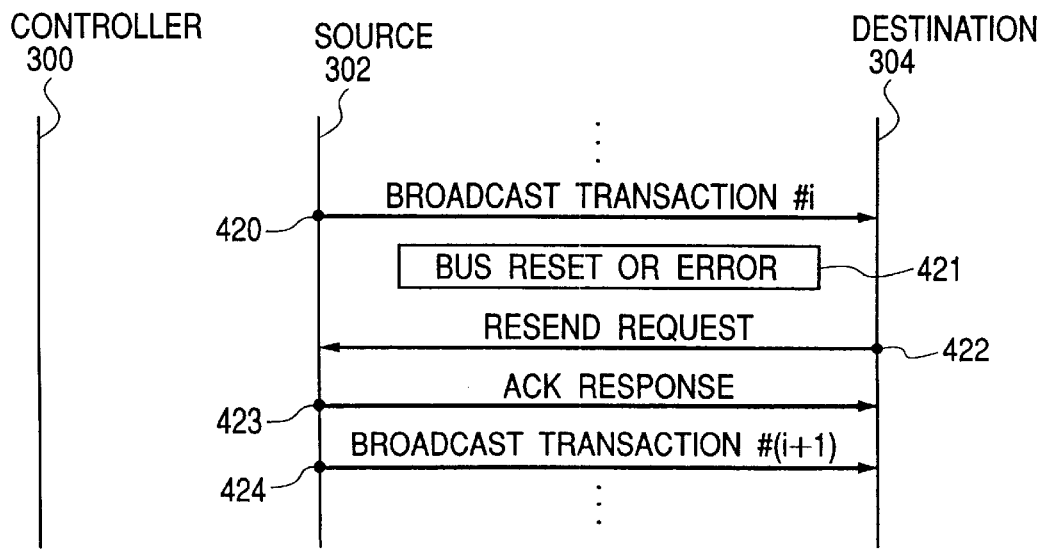
Figure 4C:
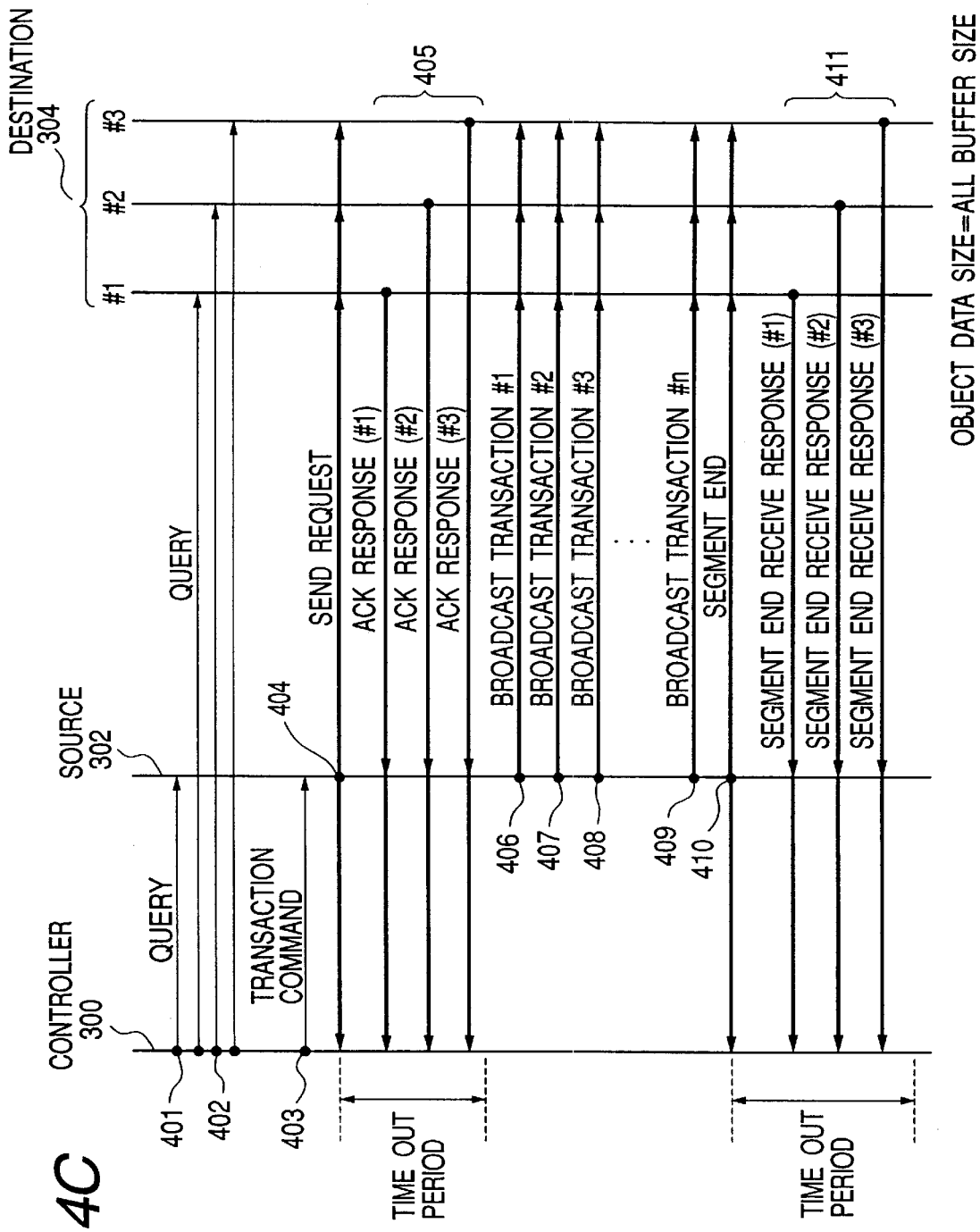

FIGS. 4A and 4C are sequence charts showing the processing performed for the transmission of one set of object data. FIG. 4B is a sequence chart showing the processing performed when a bus is reset or a transmission error occurs during the transmission of one set of object data.

According to the communication protocol in this embodiment, when the controller 300 has established the previously described connection, it transmits one set of object data by performing one or more asynchronous broadcast transactions. The detailed asynchronous broadcast transaction processing will be described while referring to FIGS. 4A to 4C. A packet used for an asynchronous broadcast transaction (hereinafter referred to as an asynchronous broadcast packet) will be explained while referring to FIG. 5.

The asynchronous broadcast transaction and the asynchronous broadcast packet are an innovative process and an innovative packet format that are specified by the communication protocol in this embodiment.

The basic transmission processing in accordance with the communication protocol in this embodiment will now be described while referring to FIGS. 4A and 4C. FIG. 4A is a sequence chart for explaining how data communication is to be performed when a connection is established with only one destination node 304. FIG. 4C is a sequence chart for explaining how data communication is performed when a single connection is employed for three destination nodes 304.

The controller 300 establishes a connection ID for identifying the logical connection relationship existing between the source node 302 and one or more destination nodes 304. The controller 300 then notifies the individual nodes of the connection ID that is to be used, and establishes a single connection (401 and 402 in FIGS. 4A and 4C).

After relaying the connection ID notification, the controller 300 instructs the source node 302 to initiate the transmission of the object data 308 (403 in FIGS. 4A and 4C).

Upon receiving the instruction, the source node 302 begins negotiations with one or more destination nodes 304, and performs the initial setup for the asynchronous broadcast transaction (404 and 405 in FIGS. 4A and 4C).

After performing the initial setup, the source node 302 executes the asynchronous broadcast transaction, and sequentially broadcasts the object data 308, which consists of one or more data segments (406 to 409 in FIGS. 4A and 4C).

Figure 7:
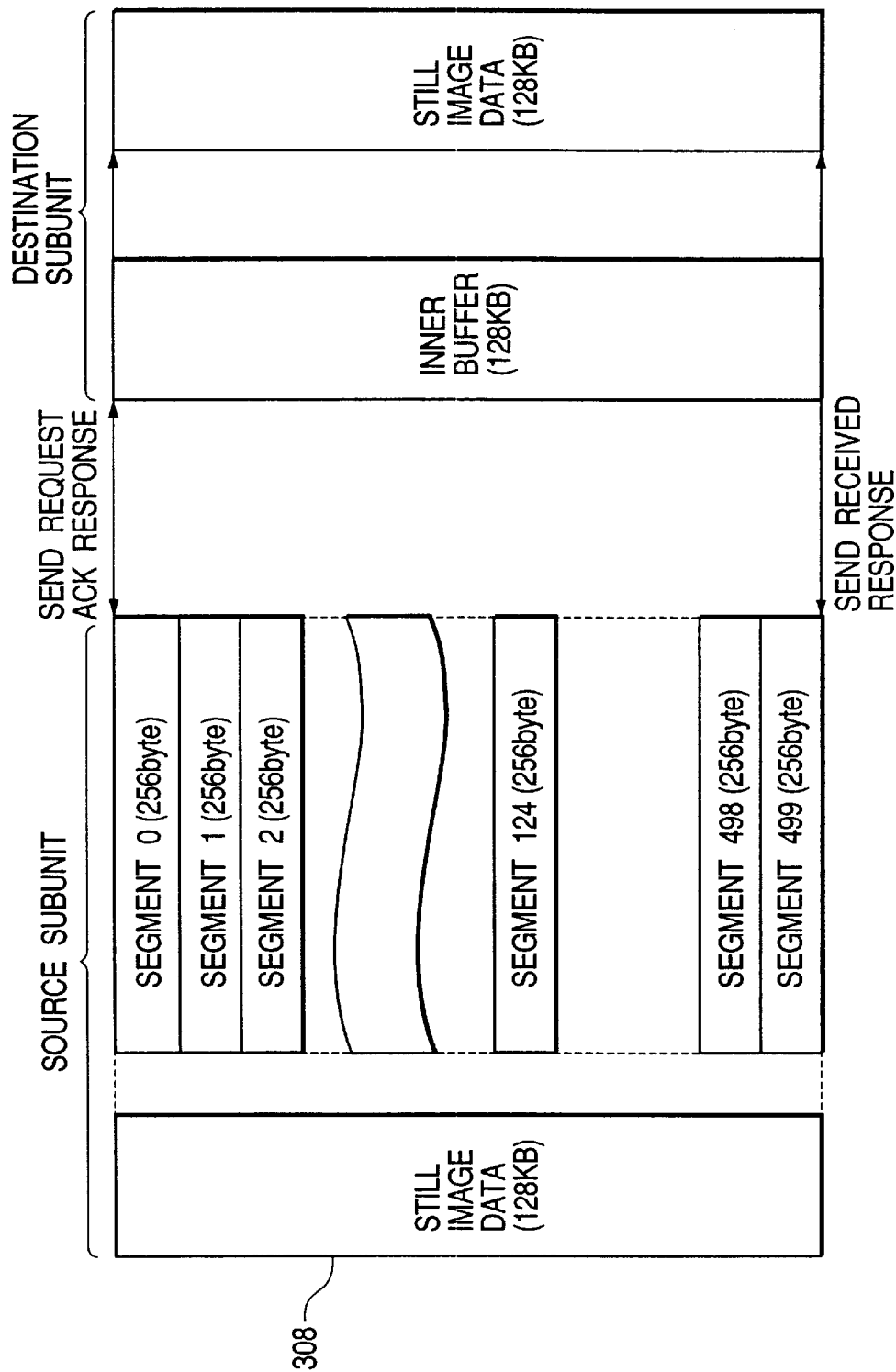
FIG. 7 is a diagram for explaining a transfer model for object data.

A transfer model for the object data 308 in this embodiment will now be described while referring to FIG. 7. The object data 308 in FIG. 7 are still image data of, for example, 128 Kbytes.

The source node 302 divides the object data 308 into, for example, 500 data segments (one data segment is 256 bytes) in accordance with the reception capabilities of the individual destination nodes 304 that are identified during the initial setup process. The size of one data segment is variably determined by the source node 30 by referring to the size of the internal buffer at each of the destination nodes 304. In FIG. 7 is shown a case where internal buffers having the same data size as that of the object data 308 are available.

The source node 302 transmits one or more data segments by performing at least one asynchronous broadcast transaction. In FIG. 7, one data segment is transmitted by performing one asynchronous broadcast transaction.

When all the data segments have been transmitted, the source node 302 terminates the data communication connection with one or more destination nodes 304 (410 and 411 in FIGS. 4A and 4C).

The operation of the controller 300 will now be explained in detail while referring to FIGS. 4A and 4C.

The controller 300 asynchronously transmits a packet for establishing a connection (hereinafter referred to as a connection request packet) to the source node 302 that was selected by the user and to one or more destination nodes 304 (401 and 402 in FIGS. 4A and 4C). A connection ID is stored in the payload of the packet to identify the connection established between the source node 302 and the destination node 304.

The connection between the source node 302 and one or more destination nodes 304 is established by the controller 300 in accordance with the connection ID previously allocated for the source node 302, and the connection ID previously allocated for each of the destination nodes 304.

The controller 300 asynchronously transmits a transaction command packet to the source node 302 (403 in FIGS. 4A and 4C).

Upon receiving the transaction command packet, the source node 302 performs the initial setup in accordance with the connection ID received from the controller 300, and executes an asynchronous broadcast transaction (404 to 409 in FIGS. 4A and 4C). By executing the asynchronous broadcast transaction, the source node 302 can sequentially transmit the object data 308 that consists of one or more data segments.

In the communication protocol in this embodiment, the controller 300 provides a function for managing the connection and the disconnection of nodes. Therefore, after the connection has been established, the transmission of the object data 308 is initiated by negotiations performed between the source node 302 and the destination nodes 304.

When a series of asynchronous broadcast transactions has been completed, the source node 302 outputs an asynchronous broadcast packet indicating the end of the segment (hereinafter referred to as a segment end packet) (410 in FIGS. 4A and 4C).

Upon receiving the segment end packet from the source node 302, the controller 300 disconnects the nodes and terminates the data transmission process (411 in FIGS. 4A and 4C).

Since the segment end packet is broadcast, the contents of the packet can also be detected by a destination node 304. Therefore, the destination node 304 instead of the controller 300 may disconnect the source node 302.

The operation of the source node 302 will now be described in detail while referring to FIGS. 4A and 4C.

When the source node 302 receives the connection request packet and the transaction command packet from the controller 300, the source node 302 transmits, to a destination node 304, an asynchronous broadcast packet requesting the transmission of a data transmission request (hereinafter referred to as a send request packet) (404 in FIGS. 4A and 4C).

The send request packet is a packet used to obtain the initial information that is required for an asynchronous broadcast transaction for the object data 308. A connection ID designated by the controller 300 is written in the packet.

The destination node 304 broadcasts an asynchronous broadcast packet (hereinafter referred to as an ack response packet) that constitutes a response to the send request packet (405 in FIGS. 4A and 4C). The same connection ID as that used for a send request packet is written in the ack response packet. Therefore, the source node 302 can examine the connection ID in the ack response packet that is received, and can identify the connection through which that packet has been transmitted.

In the ack response packet are stored the size of the internal buffer available at the destination node 304 and the offset address for a specific memory space. Upon receiving the ack response packet, the source node 302 sets the destination offset for it that designates in common the memory spaces in the destination nodes 304, and begins the asynchronous broadcast transaction. The destination offset is designated by using the offset address included in the ack response packet received from each destination node 304.

In this embodiment, the destination offset used for the asynchronous broadcast transaction is set using the offset address included in the ack response packet. However, this destination offset may be set in a different manner. For example, the controller 300 may have a function for managing the destination offsets used for individual connections, and may set destination offsets that correspond to the connection IDs. In this case, destination offsets corresponding to the connections are transmitted by the controller 300 to the source node 302.

The source node 302 writes the first asynchronous broadcast packet in the memory space indicated by the destination offset (406 in FIGS. 4A and 4C). The connection ID and the sequence number of a data segment are stored in the packet.

After transmitting the first asynchronous broadcast packet, the source node 302 waits for a response packet from the destination node 304. The destination packet 304 transmits, as a response packet, an asynchronous broadcast packet in which its connection ID and the sequence number are stored. Upon receiving the response packet, the source node 302 increments the sequence number, and transmits another asynchronous broadcast packet that includes the sequence number of the next data segment (407 in FIGS. 4A and 4C).

By repeating the above process, the source node 302 sequentially performs the asynchronous broadcast transactions (408 and 409 in FIGS. 4A and 4C). The maximum waiting time for a response from a destination node 304 is determined in advance. When no response is transmitted before the maximum waiting time has expired, the same sequence number is employed to re-transmit the same data segment.

When a response packet requesting re-transmission is issued by a destination node 304, the source node 302 can broadcast the data that correspond to the designated sequence number.

When all of the object data 308 has been transmitted by means of the asynchronous broadcast transactions, the source node 302 broadcasts the segment end packet and terminates the data transmission (410 and 411 in FIGS. 4A and 4C).

As is described above, the source node 302 divides the object data 308 into one or more segments as needed. Therefore, the transmission of above response packet will occur in association with the asynchronous broadcast transmission of the data segments. One data segment is transmitted for each asynchronous broadcast transaction that is performed. The destination node 304 includes a buffer having the above described capacity.

In this embodiment, it is so designed that a response packet is transmitted in association with the asynchronous broadcast transaction of one data segment. However, a destination node 304 may transmit a response packet after the data buffer at the destination node 304 has been filled with a plurality of sequential data segments.

The operation of destination node 304 will now be described in detail while referring to FIGS. 4A and 4C.

When a connection request packet is received from the controller 300, the destination node 304 waits for the send request packet from the source node 302 (404 in FIGS. 4A and 4C).

Upon receiving the send request packet, the destination node 304 compares the connection ID written in the packet with the connection ID received from the controller 300, and determines whether the received packet originated at the source node 302.

When the send request packet that is received is from the source node 302, the destination node 304 broadcasts the ack response packet in which are written the connection ID, the size of the available internal buffer, and the offset address that for the a specific memory space (405 in FIGS. 4A and 4C).

When an asynchronous broadcast packet received from the source node 302 is written in the memory space, the destination node 304 inspects the connection ID contained in the packet. When the connection ID stored in the packet matches the connection ID of the destination node 304, the destination node 304 broadcasts a response packet in which are stored the connection ID and the sequence number included in the received packet (406 and 409 in FIGS. 4A and 4C). In this case, the data segment included in the received asynchronous broadcast packet is stored in the internal buffer. When the connection ID included in the received packet differs from the connection ID of the destination node 304, the destination node 304 abandons the received packet.

When the destination node 304 ascertains that the sequence number of the received packet does not match, it can transmit a response packet to request a re-transmission. In this case, the destination node 304 notifies the source node 302 of the sequence number for which the re-transmission is requested.

When all the asynchronous broadcast transactions above been completed, the source node 302 broadcasts the segment end packet. Upon receiving this packet, the destination node 304 terminates the data transmission processing (410 in FIGS. 4A and 4C).

After receiving the segment end packet, the destination node 304 broadcasts a response packet indicating that it has received the segment end packet (411 in FIGS. 4A and 4C).

As is described above, the communication system in this embodiment can resolve the inconveniences encountered with a conventional communication system. In addition, the communication system in this embodiment can easily and quickly perform the transmission of data even when real-time processing is not required.

Since, when the controller establishes the connection, the object data are exchanged between the source node and the destination nodes, the controller need not be employed for the transmission, and the data transmission can be performed easily, with no complicated processing being required.

Since a destination node always transmits a response packet for each broadcast transaction, a satisfactory communication protocol can be provided.

In order to implement a more satisfactory data transmission, data transmission must be resumed rapidly without any data being lost, even when the data transmission is halted due to resetting of a bus or the occurrence of a transmission error. While referring to FIG. 4B, an explanation will now be given for the resumption processing that is specified in accordance with the communication protocol in this embodiment.

Assume that a bus reset occurs after an asynchronous broadcast packet having sequence number of i is received. Each of the nodes halts the transmission and initializes the bus, identifies the connection configuration, and sets the node ID in accordance with the procedures defined in the IEEE1394-1995 standards (420 and 421 in FIG. 4B).

When the bus has been rebuilt, the destination node 304 broadcasts a resumption request packet (resend request packet) in which the connection ID and the sequence number i are stored (422 in FIG. 4B).

When the asynchronous broadcast transaction can be resumed, the source node 302 identifies the connection ID contained in a received resend request packet, and broadcasts an ack response packet in which that connection ID is stored (423 in FIG. 4B).

Then, starting with the sequence number that was requested by the resend request packet, the source node 302 begins to sequentially broadcast data segments, i.e., data segments beginning with sequence number (i+1) (424 in FIG. 4B).

In the above described processing, even when data transmission has been halted, the controller 300, the source node 302 and the destination nodes 304 can easily and satisfactorily resume the transmission of data, without taking their node IDs into account.

As is described above, in this embodiment, the control process performed by the controller 300 can be simplified even when the data transmission has been halted.

The structure of the asynchronous broadcast packet specified in this embodiment will now be described, while referring to FIG. 5. The asynchronous broadcast packet is a data packet having one quadlet (four bytes=32 bits) as one unit.

The structure of a packet header 521 will be described first.

In FIG. 5, a field 501 (16 bits) represents destination_ID, which is a node ID of a recipient, i.e., a destination node 304. Since an asynchronous broadcast transaction of the object data 308 is implemented in accordance with the communication protocol of this embodiment, the value of the field 501 is employed as a broadcast ID, i.e., $FFFF_{16}$.

A field 502 (6 bits) represents a transaction level (tl) and is a tag inherent to each transaction.

A field 503 represents a retry (rt) code to designate a retry of the packet.

A field 504 (4 bits) represents a transaction code (tcode). The transaction code tcode designates a packet format and the type of transaction that must be performed. In this embodiment, the value of this field is set, for example, to $0001_2$, and requests a process (i.e., write transaction) for writing a data block 522 of this packet in the memory space defined by a destination_offset field 507.

A field 505 (4 bits) represents a priority (pri), and designates the priority order. In this embodiment, the value of this field is set to $0000_2$.

A field 506 (16 bits) represents a variable source_ID that is the node ID of the transmission side, i.e., the source node 302.

The field 507 (48 bits) represents a variable destination_offset, and designates in common the lower 48 bits of the address spaces included in the individual destination nodes 304. The same destination_offset value may be set for all the connections, or a different destination_offset value may be set for each connection. However, it is efficient for a different destination_offset value to be set because the asynchronous broadcast packets from a plurality of connections can be processed in parallel.

A field 508 (16 bits) represents a variable data_length, and employs bytes to indicate the length of a data field that will be described later.

A field 509 (16 bits) represents a variable extended_tcode. In this embodiment, the value of this field is set to $0000_{16}$.

A field 510 (32 bits) represents a variable header_CRC, in which error detection code corresponding to the fields 501 to 509 are stored.

A data block 522 will now be described. In this embodiment, the data block 522 is composed of header information 523 and a data field 524.

A connection ID for identifying the logical connection relationship between the nodes is included in the header information 523. The structure of the header information 513 is varied in accordance with the purpose of its use.

The data field 524 is a field having a variable length, and the data segments are stored therein. When the data segment stored in the data field 524 is not a multiple of the quadlet, a 0 is entered in a portion that does not reach the quadlet.

A field 511 (16 bits) represents a variable connection_ID, and the connection ID in this embodiment is stored therein. The 1394 interface of this embodiment employs the connection ID stored in this field 511 to identify a connection that is established between the source node 302 and one or more destination nodes 304. In this embodiment, $2^{16}\times$(the number of nodes) connections can be established. Therefore, a plurality of connections can be established before the total communication bands used by the connections reach the capacity limit for the transmission path.

A field 512 (8 bits) represents a variable protocol_type, and indicates the communication processing (i.e., the communication protocol type) that is based on the header information 5213. When the communication protocol in this embodiment is indicated, the field value is, for example, $01_{16}$.

A field 513 (8 bits) represents a variable control_flags, and predetermined control data are set therein to control the communication order according to the communication protocol in this embodiment. The most significant bit in this field 513 is employed, for example, as a re-transmission request (resend_request) flag. When the value of the most significant bit in the field is 1, it is assumed that a re-transmission has been requested according to the communication protocol of this embodiment.

A field 514 (16 bits) represents a variable sequence_number. A sequential value, i.e., a sequence number, is set for a packet that is transmitted in accordance with a specific connection ID (the connection ID designated in the field 511). With the sequence number, the destination node 304 can monitor the continuity of data segments that are sequentially transmitted by the asynchronous broadcast transactions. If the sequence number and the data segment do not match, the destination node 304 can request a re-transmission based on the sequence number.

A field 515 (16 bits) represents a variable reconfirmation_number. In this embodiment, this field is meaningful only when the re-transmission request flag is set to a value of 1. In this case, the sequence number of the packet for which re-transmission is requested is set in the field 515.

A field 516 (16 bits) represents a variable buffer_size. The buffer size for the destination node 304 is set in this field 516.

A field 517 (48 bits) represents a variable offset_address. The lower 48 bits in the address space included in the destination node 304 are stored in this field 517. With this field, one of the first memory spaces 310 in the n-th memory space 314 shown in FIG. 3 is designated.

A field 518 (32 bits) represents a variable data_CRC. An error detection code for the fields 511 to 517 (including the header information 523 and the data field 524) is stored in the variable data_CRC, as well as in the variable header_CRC described above.

Second Embodiment

In a second embodiment, an explanation will be given for an example for improving the performances of a source node 302 and destination nodes 304, and for increasing communication efficiency.

In the second embodiment, a description will be given for an arrangement wherein each connection ID is correlated with a destination offset stored in the header, and a connection through which the packet has been broadcast and received can be easily identified.

The individual nodes in the network can easily identify the connection of each asynchronous broadcast packet only by examining the destination offset in the header, and can abandon a data block of an unrelated packet, without having to decode the packet.

The transmission processing based on a communication protocol for the second embodiment will now be described, while referring to FIG. 9. The communication protocol in this embodiment is processed basically in the same manner as was the communication protocol in the first embodiment. Therefore, the same numerals are used as are used in FIGS. 4A to 4C to denote corresponding processes, and no detailed explanation for them will be given.

A controller 300 sets a connection ID to identify the logical connection relationship between the source node 302 and one or more destination nodes 304. Then, the controller 300 transmits the connection ID to the individual nodes and establishes a single connection (401 and 402 in FIG. 9).

Figure 9:
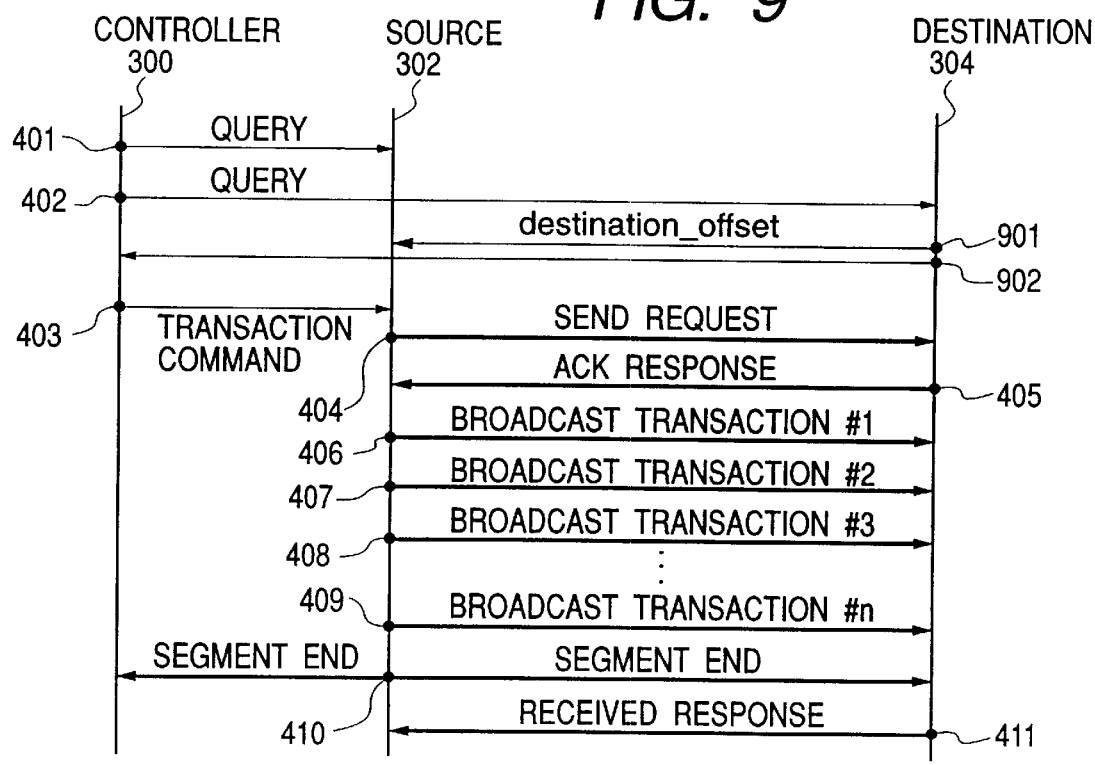
FIG. 9 is a sequence chart for explaining the communication procedure covered by a communication protocol according to a second embodiment of the present invention.

Each of the destination nodes 304 transmits, to the source node 302 and the controller 300, the destination offset that corresponds to the connection ID received from the controller 300 (901 and 902 in FIG. 9). The correlation of the connection ID and the destination offset is managed by all the nodes, and each node designated as a destination node 304 sets a destination offset that is not employed by the other connections.

After transmitting the connection ID, the controller 300 instructs the source node 302 to initiate the transmission of object data 308 (403 in FIG. 9).

Upon receiving the instruction, the source node 302 begins negotiations with one or more destination nodes 304, and performs the initial setup for data communication (404 and 405 in FIG. 9).

Each destination node 304 stores, in the previously described ack response packet, the same connection ID as that in a send request packet and the capacity of a reception buffer, and broadcasts the ack response packet. The destination node 304 does not include the offset address, unlike in the first embodiment.

After the initial setup, the source node 302 executes the asynchronous broadcast transactions and sequentially broadcasts the object data 308 that consists of one or more data segments (406 to 409 in FIG. 9). The destination offsets in the individual asynchronous broadcast packets are the offset addresses that correspond to the respective connection IDs, and that designate in common the memory spaces in the destination nodes 304.

When all the data segments have been transmitted, the source node 302 terminates the communication of data to the one or more destination nodes 304 (410 and 411 in FIG. 9).

As is described above, according to the second embodiment, since each connection ID corresponds to one of the destination offsets, a connection through which a reception packet has been broadcast can be easily identified.

Third Embodiment

In a third embodiment, as well as in the second embodiment, an explanation will be given for an example for improving the performances of a source node 302 and of destination nodes 304, and for increasing the communication efficiency.

In the third embodiment, as in the second embodiment, an explanation will be given for an arrangement wherein a connection ID and a corresponding destination offset are stored in the header of an asynchronous broadcast packet, and a connection through which a reception packet has been broadcast can be easily identified.

The individual nodes can easily identify the connections used for the asynchronous broadcast packets merely by examining the destination offset in the header, and can abandon a data block of an unrelated packet, without having to decode the packet.

The transmission processing based on a communication protocol for the third embodiment will be described while referring to FIG. 10. The communication protocol in the third embodiment is processed basically in the same manner as is the communication protocol in the first embodiment. Therefore, the same reference numerals are used as are used in FIGS. 4A to 4C to denote corresponding processes in FIG. 10, and no detailed explanation for them will be given.

A controller 300 establishes a connection ID for identifying a logical connection relationship between the source node 302 and one or more destination nodes 304. Then, the controller 300 transmits to the connection ID, and establishes a single connection (1001 and 1002 in FIG. 10).

Figure 10:
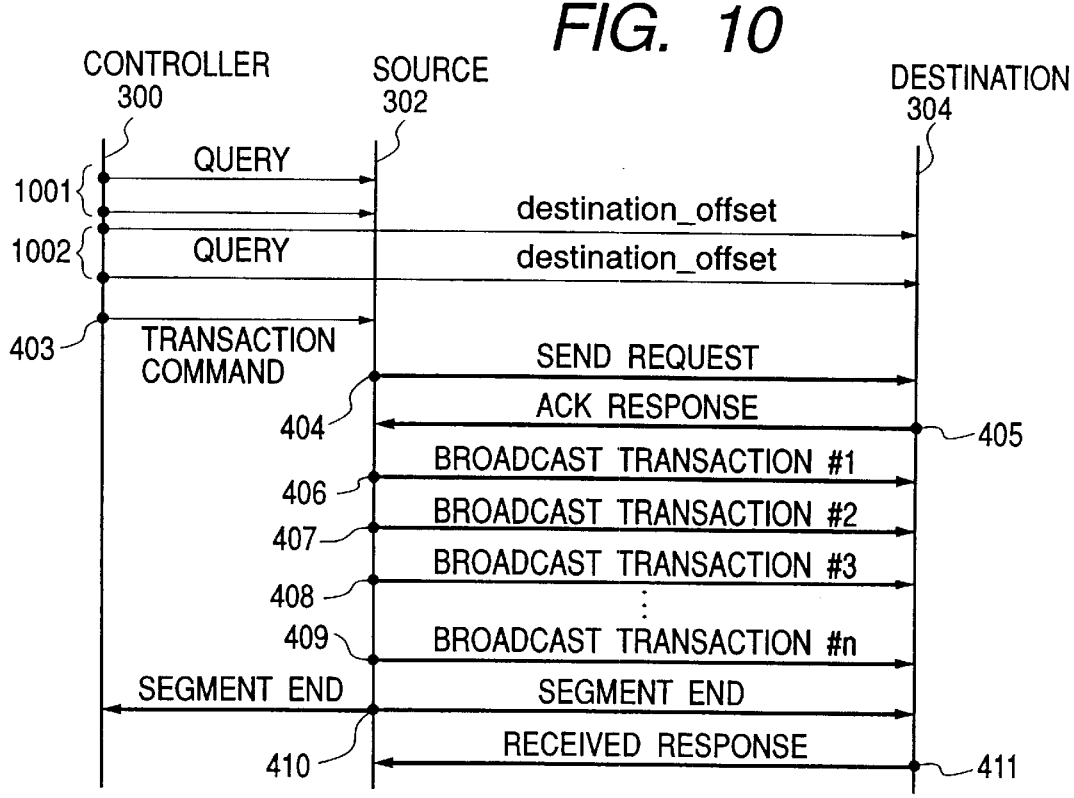
FIG. 10 is a sequence chart for explaining the communication processing covered by a communication protocol according to a third embodiment of the present invention.

At the same time, the controller 300 automatically sets a destination offset that corresponds to the connection ID, and notifies the source node 302 and one or more destination nodes 304 of the value of the destination offset (1001 and 1002 in FIG. 10).

The controller 300 performs the following processing to automatically set a destination offset that corresponds to each connection ID. For example, the controller 300 can employ expression 1 to dynamically establish the relationship between the connection ID and the destination offset.

$$A_{destination\ offset} = N_{connection\ ID} B_{data\ size} + \text{FFFFF0000800}_{16} \quad (1),$$

wherein $A_{destination\ offset}$ represents the destination offset, $N_{connection\ ID}$ represents the value of a connection ID, and $B_{data\ size}$ represents the maximum size of the data that the source node 302 can transmit by one asynchronous broadcast transaction. $B_{data\ size}$ is varied depending on the transmission capability of the source node 302, and is set, for example, at 512 bytes in this embodiment.

When a connection has not been established in the network, the controller 300 can use the whole predetermined area in the address space shown in FIG. 6B. When the connection ID is set, for example, to $0000_{16}$, the controller 300 sets a corresponding destination offset to $\text{FFFFF0000800}_{16}$ in accordance with expression (1).

When another connection has been established in the network, the controller 300 establishes a new connection for which the connection ID is, for example, $0001_{16}$. In this case, the controller 300 sets a corresponding destination offset to $\text{FFFFF0000A00}_{16}$ in accordance with expression (1).

With this arrangement, when a connection is established, the controller 300 can notify the source node 302 of the destination offset that corresponds to the connection ID.

In this embodiment, the arrangement for employing expression (1) to dynamically calculate the destination offset has been employed. However, a memory may be prepared in which connection IDs and corresponding destination offsets are stored.

After transmitting the connection ID and the destination offset, the controller 300 instructs the source node 302 to begin the transmission of the object data 308 (403 in FIG. 10).

Upon receiving the instruction, the source node 302 begins negotiations with one or more destination nodes 304, and performs the initial setup for data communication (404 and 405 in FIG. 10).

Each of the destination nodes 304 stores, in the previously described ack response packet, the same connection ID as that employed for a send request packet and the buffer size indicating the capacity of a reception buffer, and broadcasts that packet. The destination node 304 does not transmit the offset address, unlike in the first embodiment.

After the initial setup, the source node 302 performs asynchronous broadcast transactions to sequentially broadcast the object data 308 that consists of one or more data segments (406 to 409 in FIG. 10). The asynchronous broadcast packets are written to the memory spaces indicated by the destination offsets that are determined by the controller 300.

When all the data segments have been transmitted, the source node 302 terminates the data communication process with the destination nodes 304 (410 and 411 in FIG. 10).

As is described above, according to the third embodiment, as well as in the second embodiment, the connection ID and a corresponding destination offset are stored in the header, so that the connection through which the packet has been broadcast can be easily identified.

Fourth Embodiment

In a fourth embodiment, an explanation will be given for an example wherein the memory space included in a destination node 304 can be efficiently employed even when a plurality of connections are established.

In the fourth embodiment, when the destination offset stored in the header of an asynchronous broadcast packet designates a predetermined address in the memory space, the destination node 304 stores the data block of the packet directly in an internal buffer, instead of writing it in the memory space at the designated address.

With this arrangement, even when a plurality of connections are established for one destination node 304, the memory space at this node can be efficiently employed. In addition, even when the available memory space is limited, a plurality of connections can be established.

The parts of the structure that differ from the first embodiment will now be explained.

Figures 11, 12:
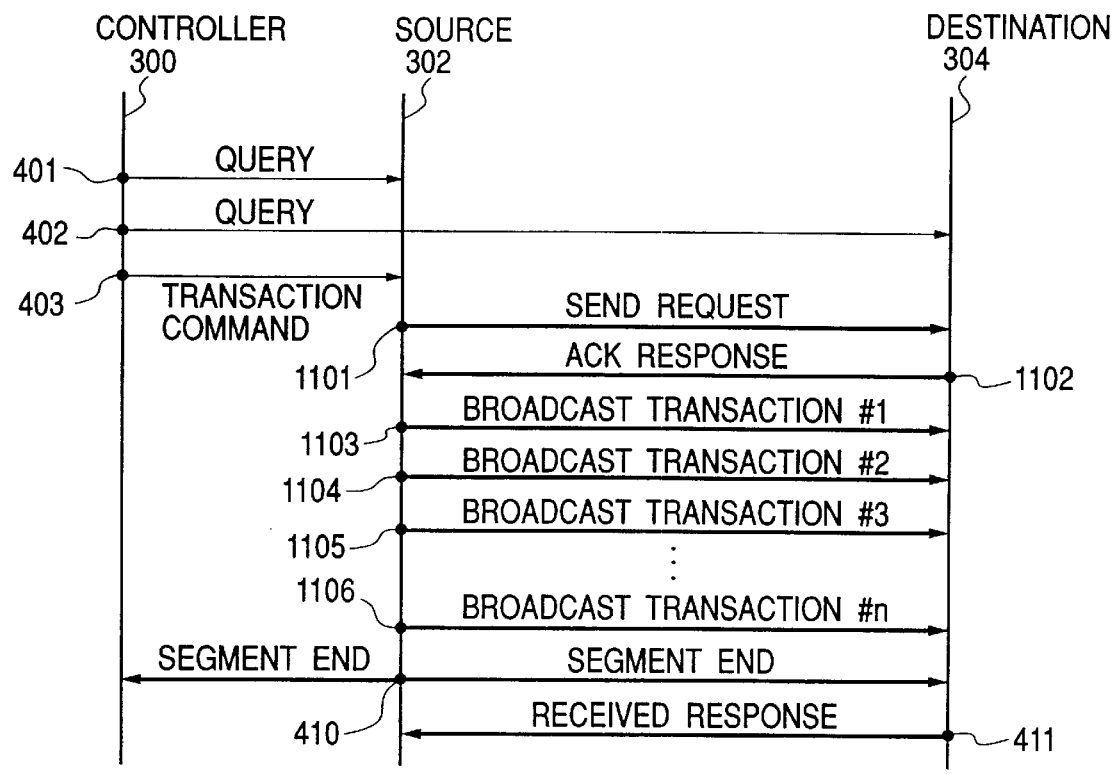
FIG. 11 is a sequence chart for explaining the communication procedure covered by a communication protocol according to a third embodiment of the present invention.
FIG. 12 is a diagram for explaining relationship among a connection ID, an offset address, a size of an inner buffer.

In the fourth embodiment, the individual nodes in a network include a table shown in FIG. 12 in which connection IDs and corresponding destination offsets and sizes for the internal buffer are entered, and a function for automatically managing them. With this function, the node that serves as a destination node 304 can designate a destination offset that does not overlap the memory space used for the connection that has been established.

Figure 13:
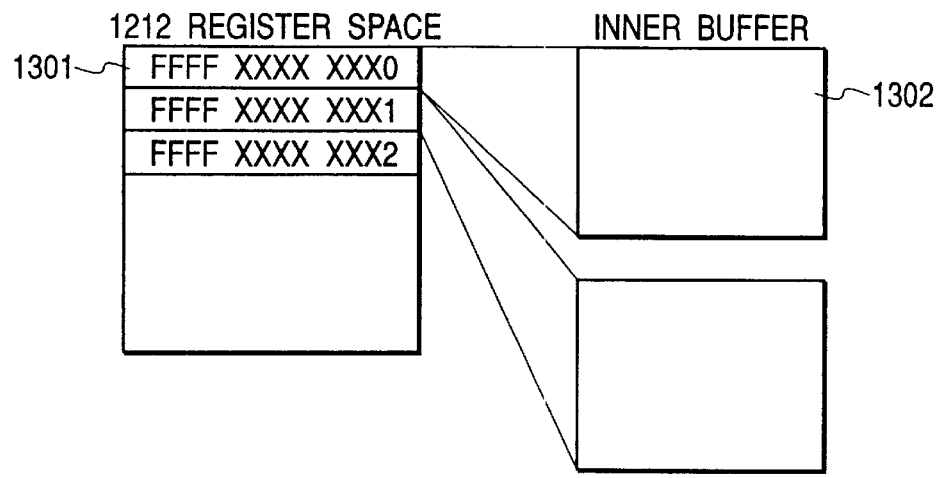
FIG. 13 is a diagram for explaining relationship between the address space and the inner buffer.

As is shown in FIG. 13, in each node in the network, the destination offset that designates a predetermined memory space 1301 of a register 1212 is employed as a pointer that indicates a predetermined memory area 1302 in the internal buffer. Therefore, the destination node 304 writes the asynchronous broadcast packet directly in the internal buffer, instead of writing that packet in the memory space.

Thus, the area in the address space occupied as a result of a plurality of asynchronous broadcast transactions can be considerably reduced.

The transmission processing based on a communication protocol for the fourth embodiment will be described while referring to FIG. 11. The communication protocol for the fourth embodiment is processed basically in the same manner as was the communication protocol for the first embodiment. Therefore, the same reference numerals are used as are used in FIGS. 4A to 4C to denote corresponding processes in FIG. 11, and no detailed explanation for them will be given.

The processing performed before the connection is established is the same as that in 401 to 403 in FIGS. 4A to 4C (401 to 403 in FIG. 11).

Upon receiving an instruction to begin the transmission, the source node 302 begins executes negotiations with one or more destination nodes 304, and performs the initial setup for data communication (1101 and 1102 in FIG. 11).

The destination nodes 304 broadcast an ack response packet in which are stored the sizes of the internal buffer and an offset address that designates a predetermined memory space. The source node 302 employs the offset addresses included in the ack response packets to set the destination offsets that designate in common the memory spaces for the destination nodes 304.

After the initial setup, the source node 302 executes asynchronous broadcast transactions to sequentially broadcast the object data 308 that consists of one or more data segments (1103 to 1106 in FIG. 11).

The destination nodes 304 store the asynchronous broadcast packets directly in their internal buffers, instead of writing them in the memory spaces.

When all the data segments have been transmitted, the source node 302 terminates the data communication with the one or more destination nodes 304 (410 and 411 in FIG. 11).

As is described above, according to the present invention, even when a plurality of connections are established for one destination node 304, the memory space can be efficiently employed. In addition, even when the available memory space is limited, a plurality of connections can be established.

Fifth Embodiment

For a fifth embodiment, an explanation will now be given for an example where the processing according to a communication protocol is simplified.

In the fifth embodiment, the individual nodes in a network include a table in which connection IDs and corresponding offset addresses are stored. Thus, a source node 302 can begin the execution of asynchronous broadcast transactions without transmitting the previously described send request packet to one or more destination nodes 304.

The arrangement that differs from the first embodiment will now be described.

In the fifth embodiment, the nodes of the network includes a table shown in FIG. 15 in which connection IDs and corresponding offset addresses are stored. Each node refers to the table, automatically selects an offset address that corresponds to the connection ID determined by the controller 300, and executes the asynchronous broadcast transaction. The offset address is varied depending on the connection ID.

In the initial setup process (404 and 405 in FIGS. 4A to 4C), the buffer size that is forwarded by one or more destination nodes 304 is automatically selected in accordance with the speed for the transfer of data between the source node 302 and one or more destination nodes 304. Each of the nodes includes a table shown in FIG. 16 in which the data transfer speed and the maximum value for the buffer size are stored. The optimal buffer size is determined in accordance with the table.

The network in this embodiment copes with 100 Mbps, 200 Mbps and 400 Mbps, as is shown in FIG. 16. The maximum values for the individual buffer sizes are varied depending on the data transfer speed. As, for example, the data transfer speed is increased, the buffer size is also increased.

When a table that is prepared in advance is employed, the initial setup before the asynchronous broadcast transaction is performed can be eliminated. Thus, the transmission processing can be considerably simplified, and the communication efficiency can be increased. This is especially effective when a large number of destination nodes 304 are employed.

The transmission processing based on the communication protocol in this embodiment will now be described while referring to FIG. 14. The communication protocol for the fifth embodiment is processed in the same manner as was the communication protocol in the first embodiment. Therefore, in FIG. 14, the same reference numerals are used as are used in FIGS. 4A to 4C to denote corresponding processes, and no detailed explanation for them will be given.

The operation of a controller 300 will now be described in detail while referring to FIG. 14.

Figure 14:
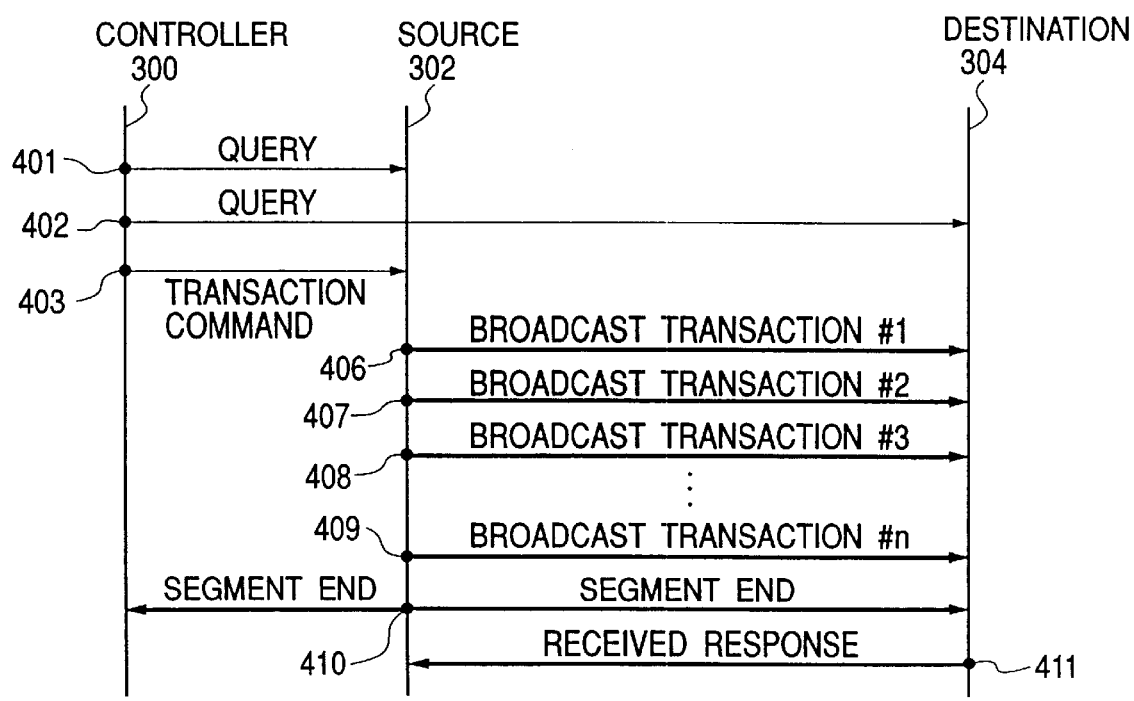
FIG. 14 is a sequence chart for explaining the communication procedure covered by a communication protocol according to a fifth embodiment of the present invention.

The controller 300 asynchronously transmits a connection request packet to the source node 302 and one or more destination nodes 304, as in FIGS. 4A to 4C (401 and 402 in FIG. 14).

The controller 300 asynchronously transits a transaction command packet to the source node 302 (403 in FIG. 14).

Following this, the previously described asynchronous broadcast transactions are is performed between the source node 302 and the destination nodes 304.

The controller 300 receives a segment end packet from the source node 302, disconnects the nodes, and terminates the data transmission (410 in FIG. 14).

The operation of the source node 302 will now be described in detail.

When the source node 302 receives a connection request packet and a transaction command packet from the controller 300, the source node 302 sets the offset address by examining the connection ID received from the controller 300 and the table shown in FIG. 15. The source node 302 also sets a buffer size by examining the available data transfer speed and the table shown in FIG. 16.

The source node 302 then generates one or more asynchronous broadcast packets by using the offset address and the buffer size that have been determined, and transmits the packet as an asynchronous broadcast transaction (406 in FIG. 14). The connection ID and the sequence number of a data segment are stored in each asynchronous broadcast packet.

After transmitting the asynchronous broadcast packet, the source node 302 waits for a response packet from the destination node 304. The destination node 304 transmits, as a response packet, an asynchronous broadcast packet in which the connection ID and the sequence number are stored. Upon receiving the response packet, the source node 302 increments the sequence number, and transmits an asynchronous broadcast packet in which is included the next data segment (407 in FIG. 14).

As the above process is repeated, the source node 302 sequentially transmits the asynchronous broadcast packets (408 and 409 in FIG. 14).

When all the object data 308 has been transmitted by the asynchronous broadcast transactions, the source node 302 broadcasts a segment end packet and terminates the data transmission (410 and 411 in FIG. 14).

The operation of a destination node 304 will now be described while referring to FIG. 14.

When a connection request packet and a transaction command packet are received from the controller 300, the destination node 304 determines the offset address by examining the connection ID received from the controller 300 and the table shown in FIG. 15. In addition, the destination node 304 determines the buffer size by examining the available data transfer speed and the table shown in FIG. 16.

The destination node 304 then waits until an asynchronous broadcast packet is written in the address space at the determined offset address. When the asynchronous broadcast packet has been written in the address space, the destination node 304 confirms the connection ID.

When the connection ID of the received packet matches the connection ID of the destination node 304, it broadcasts a response packet in which the connection ID and the sequence number included in the received packet are stored (406 to 409 in FIG. 14). The data segment included in the received packet is then stored in the internal buffer.

When the segment end packet is received, the destination node 304 broadcasts a response packet indicating that the segment end packet has been normally received (410 and 411 in FIG. 14).

As is described above, according to the fifth embodiment, the source node 302 can execute an asynchronous broadcast transaction without transmitting the connection request packet to one or more destination nodes 304.

Furthermore, the execution of an asynchronous broadcast transaction for which a plurality of connection designate the same offset address can be prevented.

As is described above, according to the individual embodiments, a logical connection relationship that does not depend on the physical connection form can be built in a bus network that conforms to the IEEE1394-1995 standards.

In these embodiments, for the communication system that conforms to the IEEE1394-1995 standards, an innovative communication protocol can be provided according to which a comparatively large amount of object data (e.g., still image data, graphics data, text data, file data, program data, etc.), for which reliability is requested even though real-time processing is not required, can be divided into one or more data segments and the data segments can be sequentially transmitted.

In addition, according to the above embodiments, for a communication system that conforms to the IEEE1394-1995 standards, an innovative communication protocol can be provided with which data communication between a plurality of devices can be implemented by using a communication method for the asynchronous broadcasting of data.

Furthermore, according to the above embodiments, a plurality of sets of continuous data can be satisfactorily transmitted, without requiring the isochronous transmission method that conforms to the IEEE1394-1995 standards. One set of object data can be divided into a plurality of data segments that can be individually transmitted.

Further, according to the above embodiments, since communication among a plurality of devices is managed at one connection, multiple communications that do not require a very large communication band can be performed at the same time.

Multiple communications can be performed in a transmission band wherein only a few nodes are employed.

In the above embodiments, even when the data transmission is halted due to a bus reset or a transmission error, information can be transmitted concerning the contents of data that have been lost, and the transmission can be resumed without very complicated processing being required.

Other Embodiment

The communication protocols in the above embodiments and the various operations required to implement them can be achieved by software.

For example, a storage medium on which program code is stored to implement the functions in the first to the fifth embodiments is supplied to the controllers (the MPU 12, the system controller 50 and the printer controller 68 in FIG. 2) of apparatuses that constitute the communication system in the individual embodiments. The controllers permit the communication system or the apparatuses to read the program code from the storage medium, and to implement the functions of the embodiments in accordance with the program code, so that the above embodiments can be implemented.

Further, a storage medium on which program code is stored to implement the functions in the first to the fifth embodiments is supplied to the 1394 interfaces 14, 44 and 62 of the apparatuses. The controller (e.g., the serial bus management unit 806 in FIG. 8) permits the 1394 interfaces 14, 44 and 62 to implement the functions of the embodiments in accordance with the program code stored in the storage medium, so that the above embodiments can be implemented.

In this case, the program code read from the storage medium is used to implement the functions of the above described embodiments. The program code or the means (e.g., the storage medium) on which the program code is stored constitutes the present invention.

A storage medium for supplying such program code can be, for example, a floppy disk, a hard disk, an optical disk, a magneto optical disk, a CD-ROM, a magnetic tape, a nonvolatile memory card, or a ROM.

In addition, the scope of the present invention includes a case wherein the functions of the first to the fifth embodiments can be implemented when the program code is read from the storage medium and stored in a memory included in a function expansion unit that is connected to the above controller, and wherein the controller in the function expansion unit performs one part, or all of the actual processing, in accordance with the program code stored in the memory.

The present invention may be embodied in other specific forms without departing from the spirit or essential characteristics thereof.

For example, in the above embodiments, the communication protocol that can be applied to the network that conforms to the IEEE1394-1995 has been explained. However, the communication protocol in these embodiments can be applied for a bus network that conforms to the IEEE1394-1995 standards, and a network that can virtually constitute a bus network.

Therefore, the above mentioned embodiments are merely examples in all respects, and must not be construed as limiting the invention.

The scope of the present invention is defined by the scope of the appended claims, and is not limited at all by the specific descriptions given in this specification. Furthermore, all the modifications and changes belonging to the equivalents of the claims are considered as falling within the scope of the present invention.

What is claimed is:

1. A controller that manages a logical connection between a source node and one or more destination nodes, said controller comprising:

determining means for determining a connection ID for identifying said logical connection; and notifying means for notifying said source node and said one or more destination nodes of said connection ID before said source node starts to transmit packets to said one or more destination nodes.

2. A controller according to claim 1, wherein said connection ID corresponds to address information for identifying a part of a memory space of each destination node.

3. A controller according to claim 1, further comprising canceling means for canceling said logical connection after said source node transmits all of said packets to said one or more destination nodes.

4. A controller according to claim 1, wherein said source node and said one or more destination nodes are connected with a serial bus.

5. A method of managing a logical connection between a source node and one or more destination nodes, said method comprising steps of:

determining a connection ID for identifying the logical connection; and notifying the source node and the one or more destination nodes of the connection ID before the source node starts to transmit packets to the one or more destination nodes.

6. A method according to claim 5, wherein the connection ID corresponds to address information for identifying a part of a memory space of each destination node.

7. A method according to claim 5, further comprising a step of canceling the logical connection after the source node transmits all of the packets to the one or more destination nodes.

8. A method according to claim 5, wherein the source node and the one or more destination nodes are connected with a serial bus.

* * * * *

UNITED STATES PATENT AND TRADEMARK OFFICE
CERTIFICATE OF CORRECTION

PATENT NO. : 6,678,769 B1  Page 1 of 1
DATED : January 13, 2004
INVENTOR(S) : Shinichi Hatae et al.

It is certified that error appears in the above-identified patent and that said Letters Patent is hereby corrected as shown below:

Title page,
Insert Item -- [74], *Attorney, Agent, or Firm* - Fitzpartrick, Cella, Harper & Scinto --.

Column 10,
Line 3, "interface" should read -- interface, --.

Signed and Sealed this

Twenty-third Day of August, 2005

JON W. DUDAS
*Director of the United States Patent and Trademark Office*